(12) United States Patent
Thompson

(10) Patent No.: US 8,166,805 B1
(45) Date of Patent: *May 1, 2012

(54) ENGINE MISFIRE DETECTION PROBE

(76) Inventor: Bernie C. Thompson, Tijeras, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/572,859

(22) Filed: Oct. 2, 2009

Related U.S. Application Data

(63) Continuation of application No. 11/879,565, filed on Jul. 17, 2007, now Pat. No. 7,694,554.

(51) Int. Cl.
*G01M 15/11* (2006.01)

(52) U.S. Cl. .................................. 73/114.06; 73/114.76

(58) Field of Classification Search ............... 73/114.02, 73/114.06, 114.76, 114.69
See application file for complete search history.

(56) References Cited

U.S. PATENT DOCUMENTS

| | | | | |
|---|---|---|---|---|
| 3,924,457 A * | 12/1975 | Oshima et al. | ............ | 73/114.06 |
| 5,216,881 A * | 6/1993 | Anlauf et al. | .................. | 60/276 |
| 5,383,350 A * | 1/1995 | Bennett et al. | .............. | 73/35.01 |
| 6,546,812 B2 * | 4/2003 | Lewis | ........................ | 73/861.63 |
| 6,810,725 B2 * | 11/2004 | Henderson et al. | ........ | 73/114.74 |
| 6,823,748 B2 * | 11/2004 | Silvis et al. | ................ | 73/863.03 |
| 7,406,879 B2 * | 8/2008 | Adams et al. | .............. | 73/861.52 |
| 7,801,671 B1 * | 9/2010 | Pederson et al. | ............. | 701/111 |
| 7,899,608 B1 * | 3/2011 | Pederson et al. | ............. | 701/111 |
| 2002/0157482 A1 * | 10/2002 | Silvis et al. | ..................... | 73/864 |
| 2002/0189369 A1 * | 12/2002 | Lewis | ....................... | 73/861.63 |
| 2004/0107762 A1 * | 6/2004 | Silvis et al. | .................... | 73/1.06 |
| 2005/0061054 A1 * | 3/2005 | Silvis et al. | .................... | 73/1.06 |
| 2007/0272032 A1 * | 11/2007 | Adams et al. | ............. | 73/861.52 |

* cited by examiner

*Primary Examiner* — Eric S McCall
(74) *Attorney, Agent, or Firm* — Todd E. Rinner

(57) ABSTRACT

A probe and method for sensing pressure variations in the exhaust stream of an engine for detecting cylinder misfires. The probe includes a Venturi tube placed in the exhaust stream. The Venturi tube has a sensing tube with an aperture, and the sensing tube is coupled to a pressure sensor for monitoring the pressure of the exhaust stream within the Venturi tube at the point of the aperture. The pressure sensor then generates a voltage signal based on the pressure, and this voltage signal is viewed on an oscilloscope or processed by a microprocessor to generate a waveform readable by a technician. The waveform will indicate the presence of a misfiring cylinder(s), and more specifically, which cylinder(s) is misfiring.

12 Claims, 35 Drawing Sheets
(33 of 35 Drawing Sheet(s) Filed in Color)

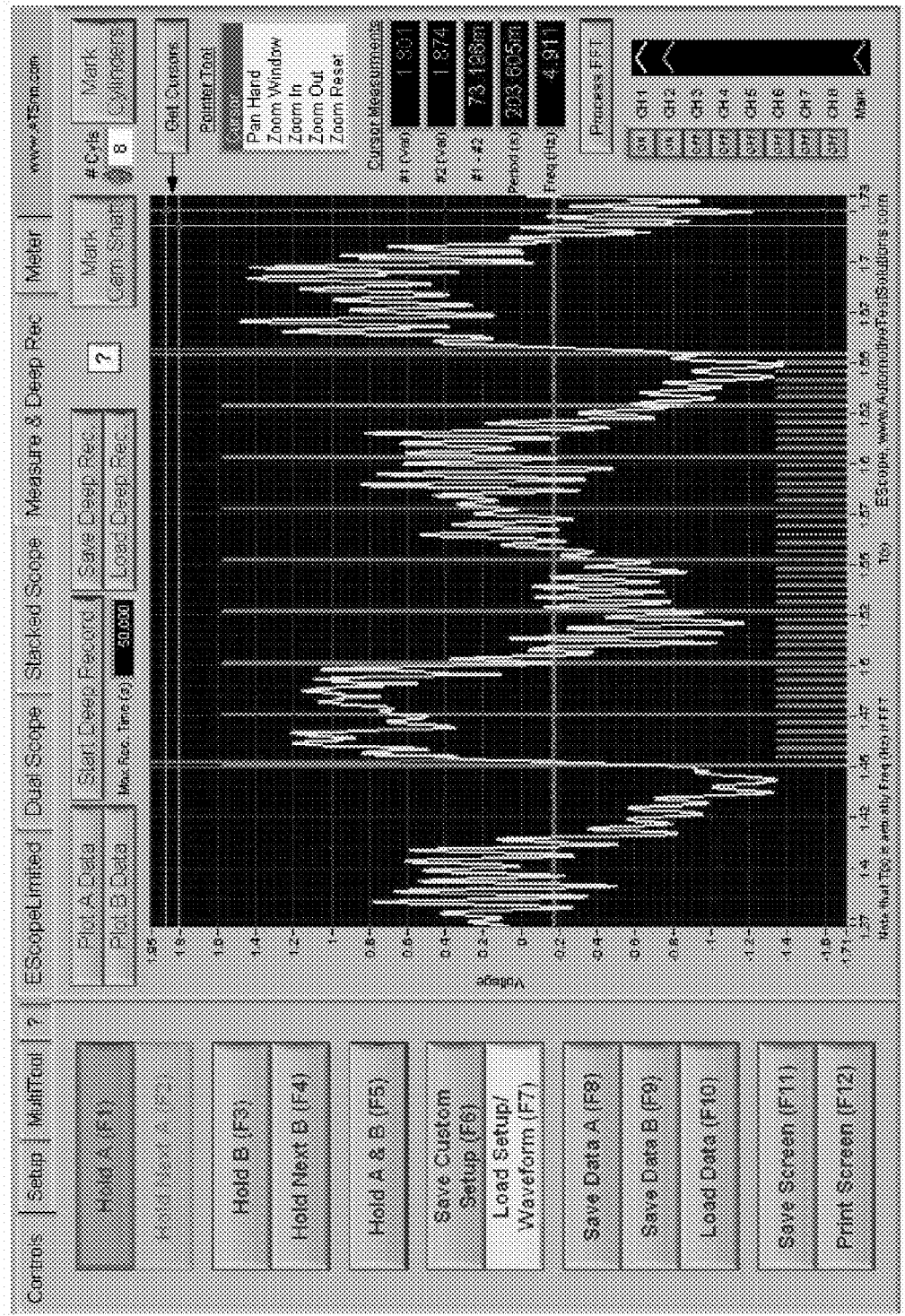
FIG 5A – PRIOR ART

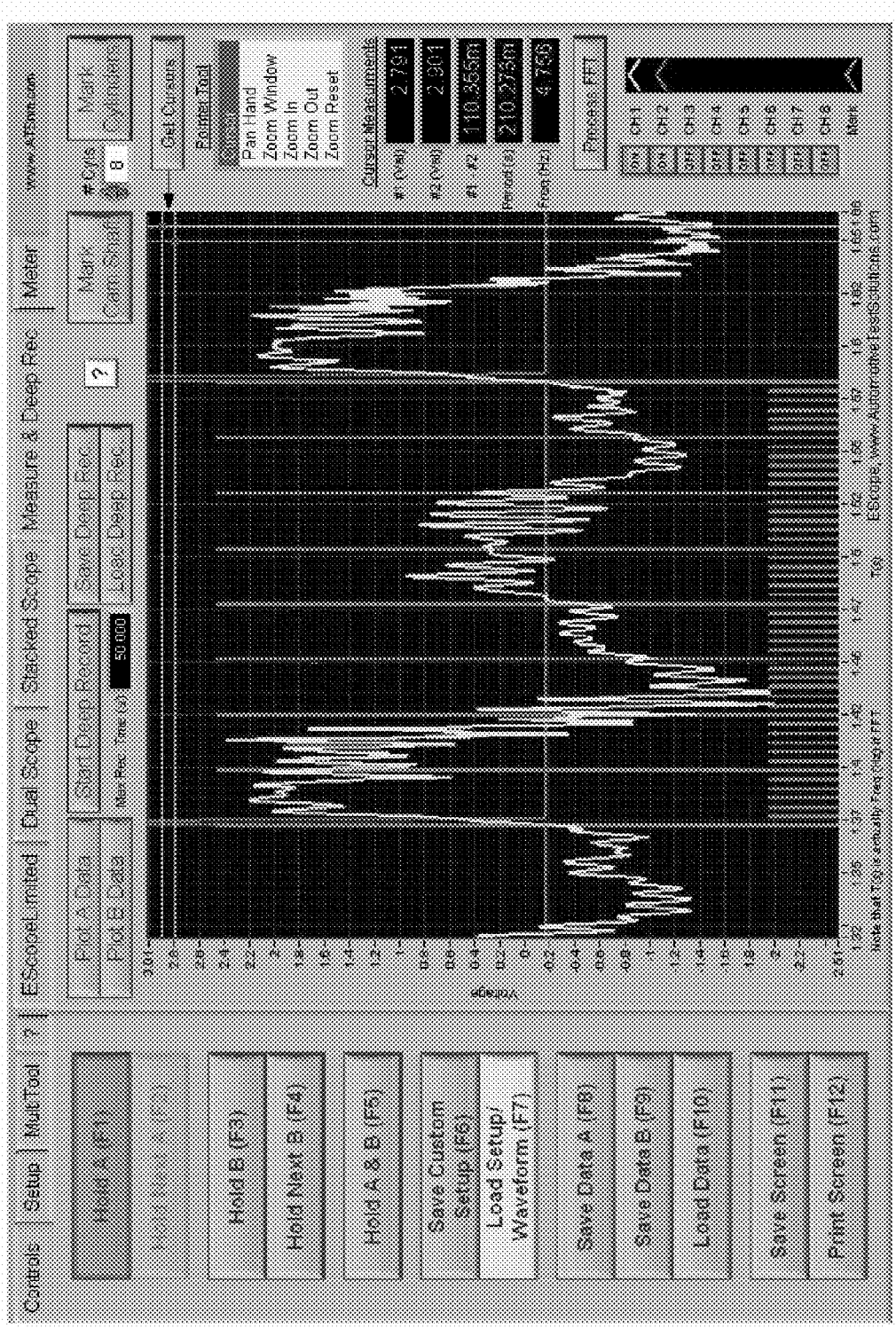
FIG 5B - PRIOR ART

ENGINE MISFIRE DETECTION PROBE

CROSS-REFERENCE TO RELATED APPLICATIONS

This application is a continuation of, and claims priority to and the benefit of, U.S. Utility patent application Ser. No. 11/879,565, entitled "Engine Misfire Detection Probe," filed on Jul. 17, 2007, and issuing as U.S. Pat. No. 7,694,554 on Apr. 13, 2010, the specification (claims, drawings and all text, inclusive) of which is incorporated herein by reference.

FIELD OF THE INVENTION

The present invention relates to internal combustion engine misfires, and more particularly to a method and apparatus for detecting engine misfires.

BACKGROUND OF THE INVENTION

The internal combustion engine has been the work horse of the modern world for over 100 years. From its conception, misfiring cylinders have been a concern for users. A "misfire" is a lack of complete combustion in one or more cylinders in an engine and may be caused by a variety of sources (for example, a faulty spark plug). Early on, the use of one-cylinder engines meant that engine misfire detection was not needed. However, with the advent of multiple-cylinder engines, a way of detecting which cylinder of a multi-cylinder engine was misfiring was needed. Ways of detecting misfires have been introduced over the many years that the internal combustion engine has been in service. However, the problem with these prior methods is the difficulty of use and lack of accuracy of the testing devices.

During a misfire, a pressure pulse is generated in the exhaust stream, and the pulse moves from the atmospheric pressure back into the exhaust system (referred to as a "negative pulse"). This negative pulse is an indication of a cylinder that has not completed the combustion event within the cylinder. There have been previous attempts to detect a misfire from exhaust pulsations. The Senx™ FirstLook™ probe is one such device. The Senx™ probe detects exhaust pulses and generates a voltage that can be viewed on an oscilloscope. The problem with this and other such devices is the resonant frequency that is created in the exhaust system. Such sensors produce a waveform that moves with each of the fluctuating exhaust pulses. These fluctuating pulses are not desirable when detecting a misfire from the exhaust system. What is needed is a way to filter out these fluctuating pulses and amplify the negative pulse.

SUMMARY OF THE INVENTION

The present invention comprises a probe and method for sensing pressure variations in the exhaust stream of an engine for detecting cylinder misfires. The probe includes a Venturi tube placed in the exhaust stream. The Venturi tube has a sensing tube with an aperture, and the sensing tube is coupled to a pressure sensor for monitoring the pressure of the exhaust stream within the Venturi tube at the point of the aperture. The pressure sensor then generates a voltage signal based on the pressure, and this voltage signal is viewed on an oscilloscope or processed by a microprocessor to generate a waveform readable by a technician. The waveform will indicate the presence of a misfiring cylinder(s), and more specifically, which cylinder(s) is misfiring.

DESCRIPTION OF ATTACHED FIGURES AND PICTURES

The patent or application file contains at least one drawing executed in color. Copies of this patent with color drawing(s) will be provided by the Patent and Trademark Office upon request and payment of necessary fee.

Figure 4A:
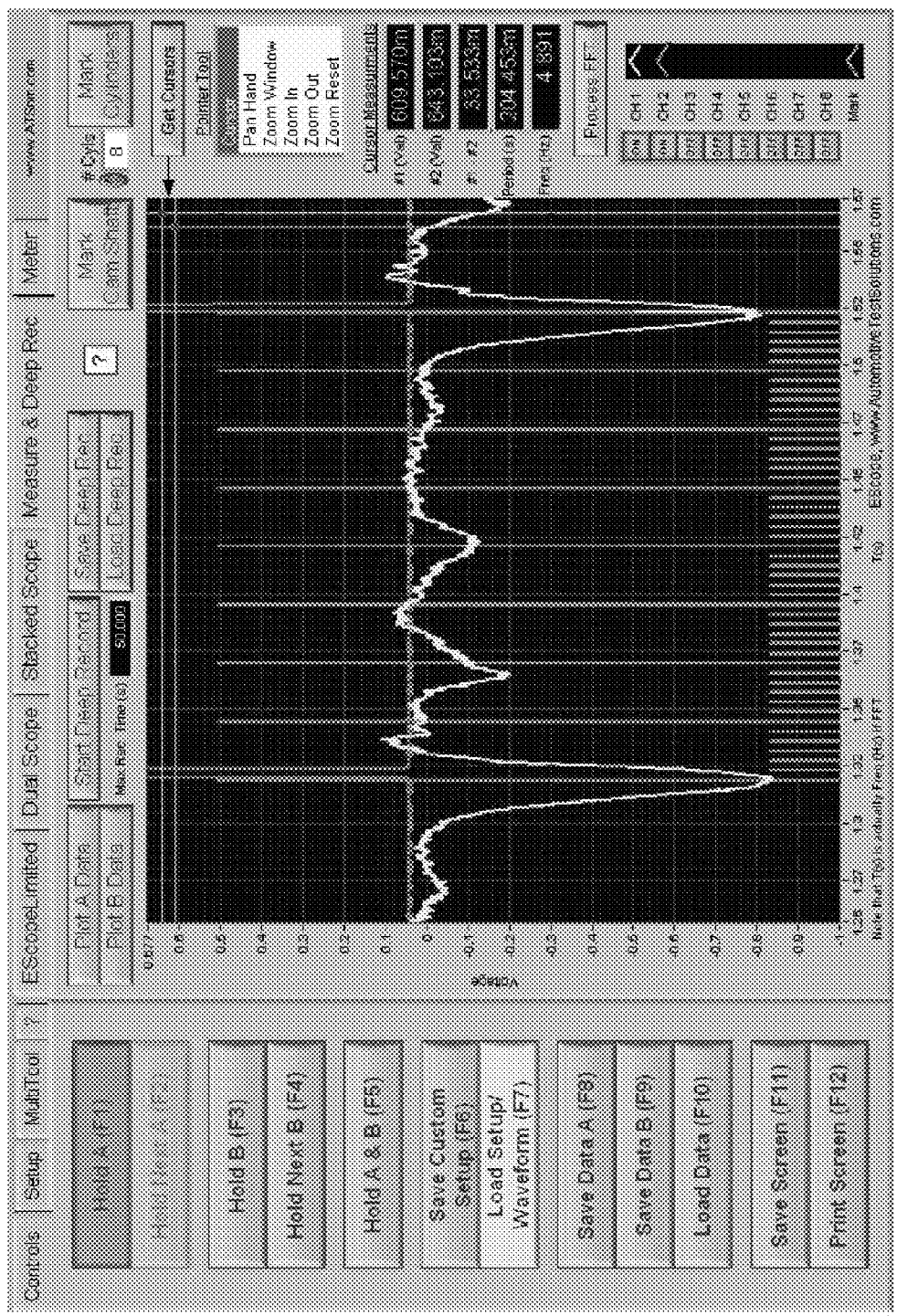
Figure 4B:
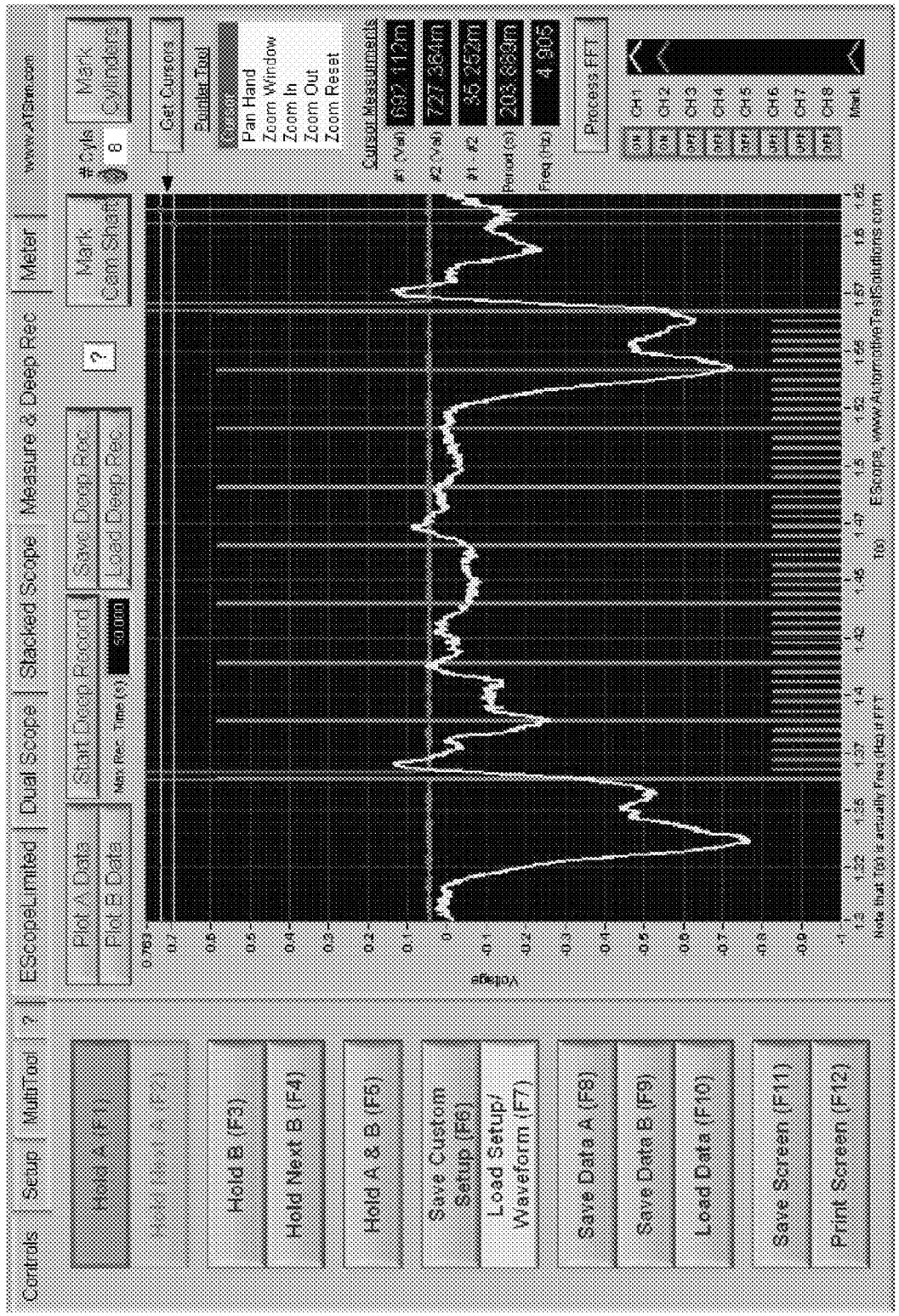
Figure 4C:
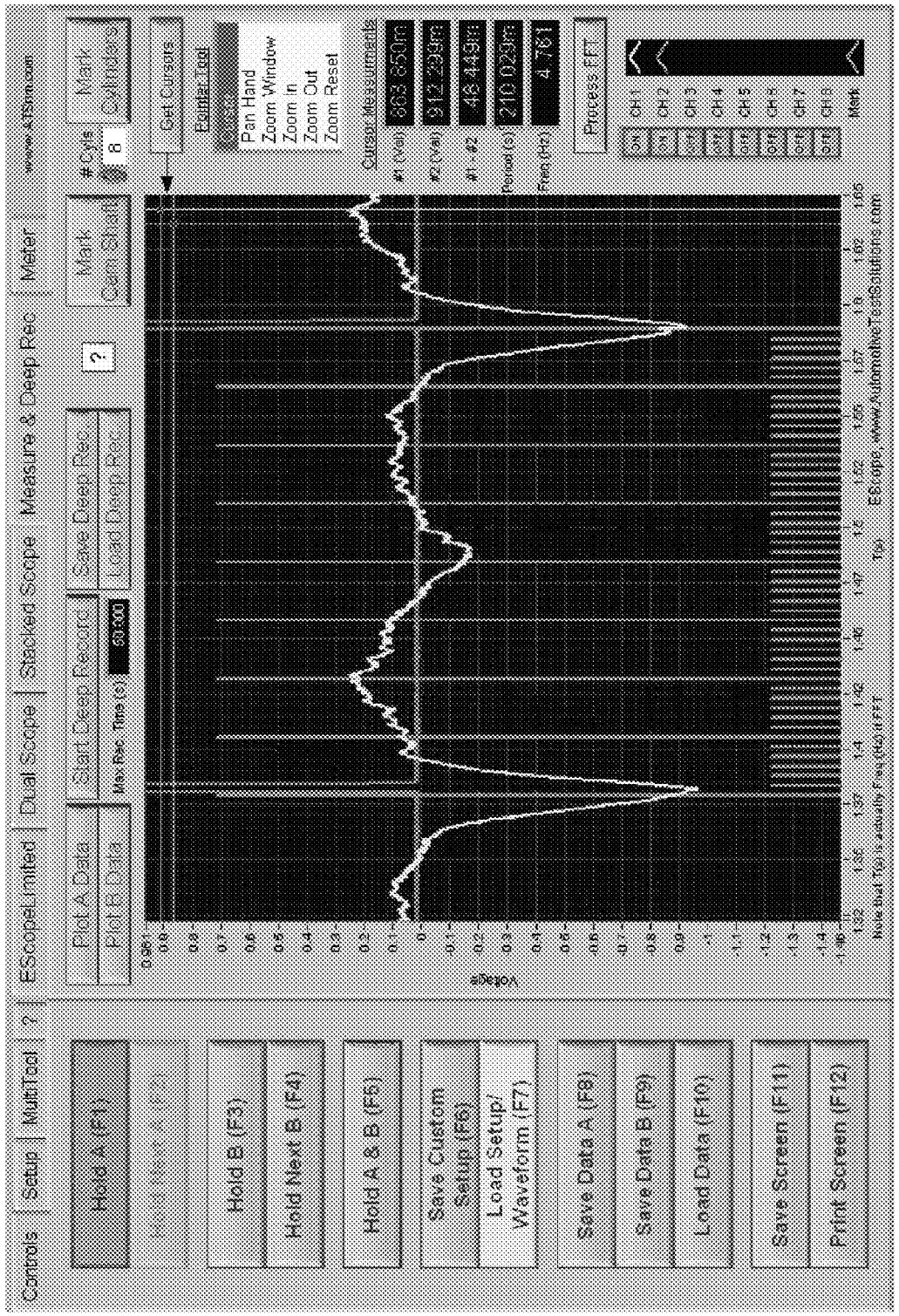
Figure 4D:
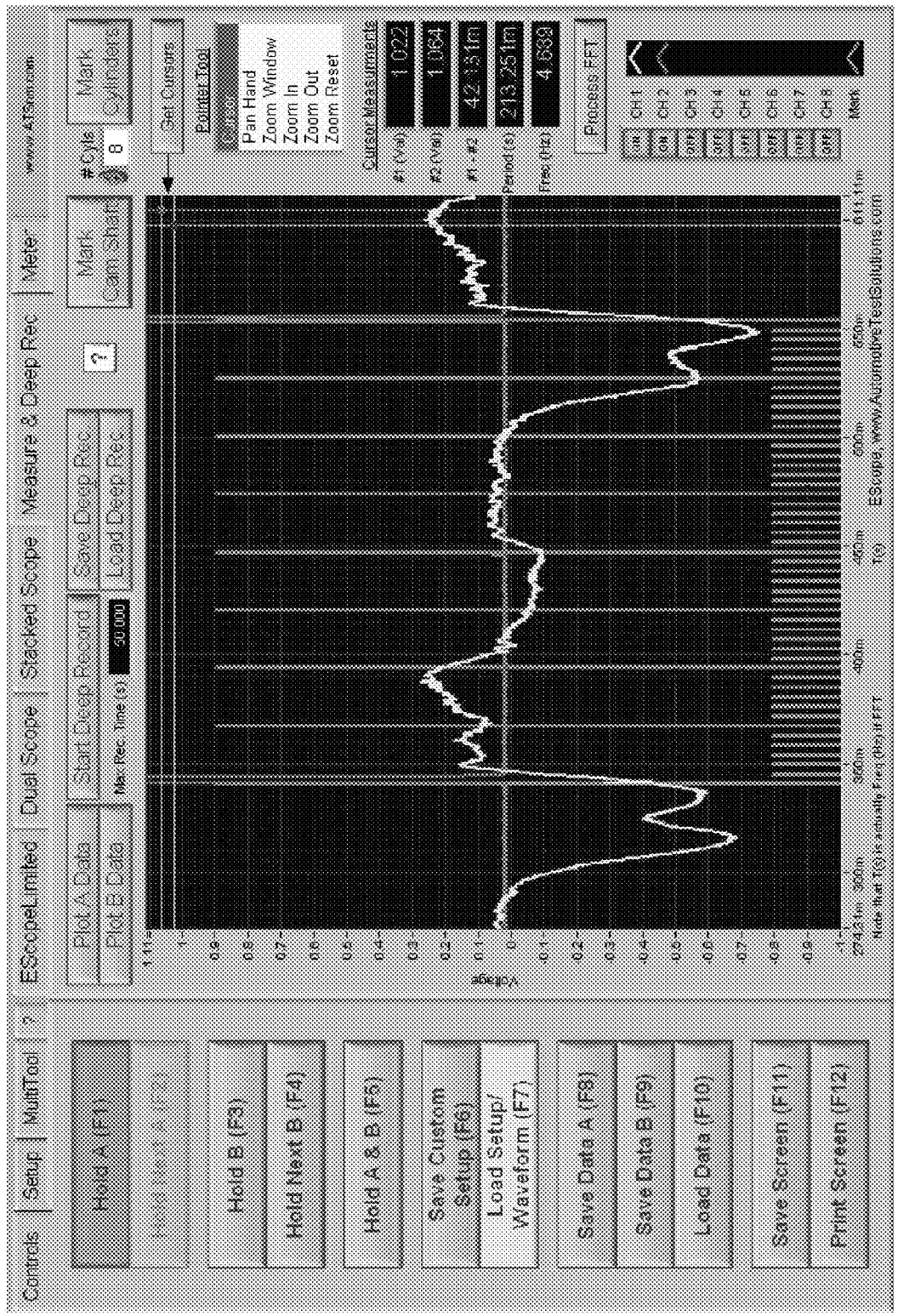
Figure 4E:
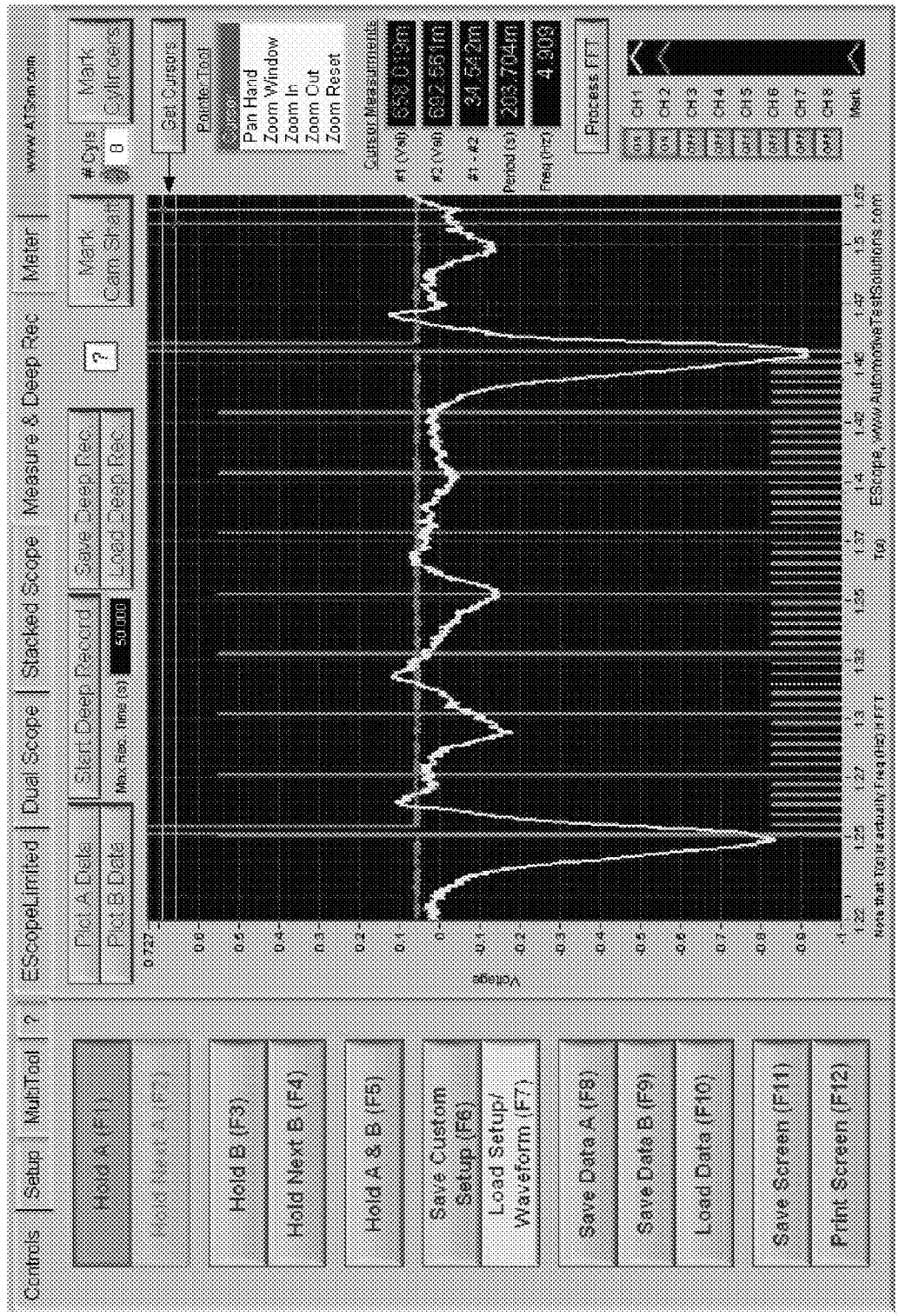
Figure 4F:
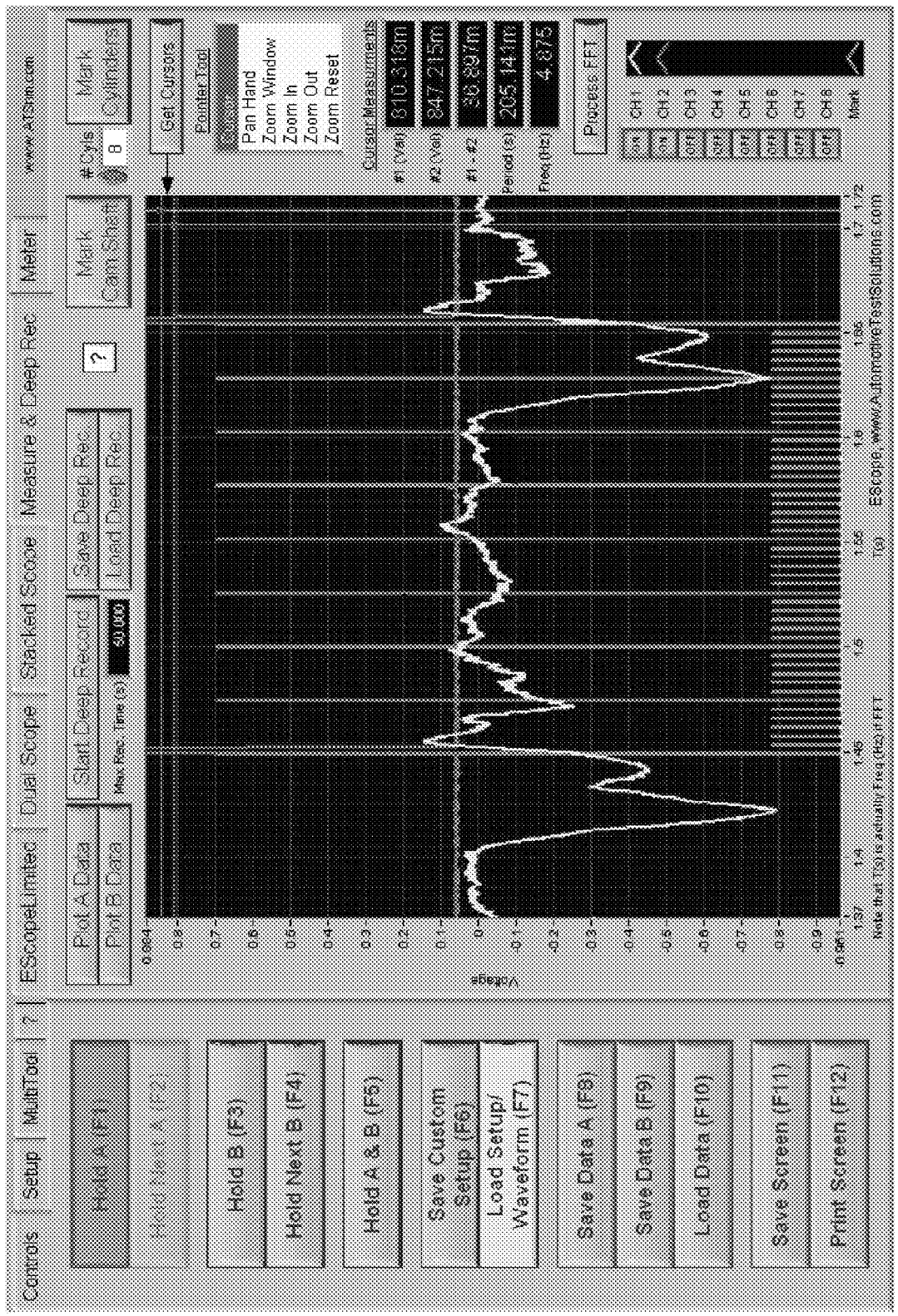
Figure 4G:
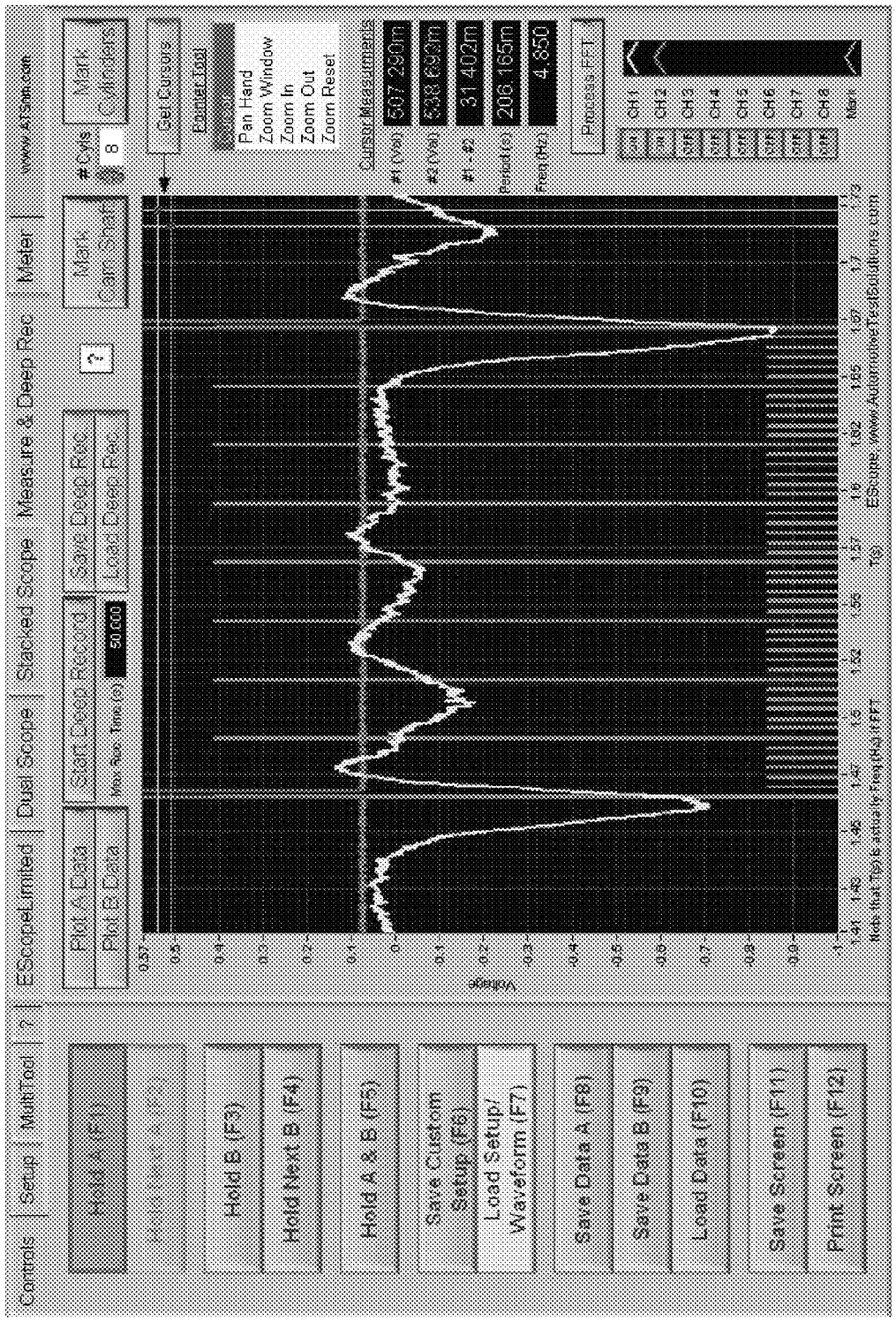
Figure 4H:
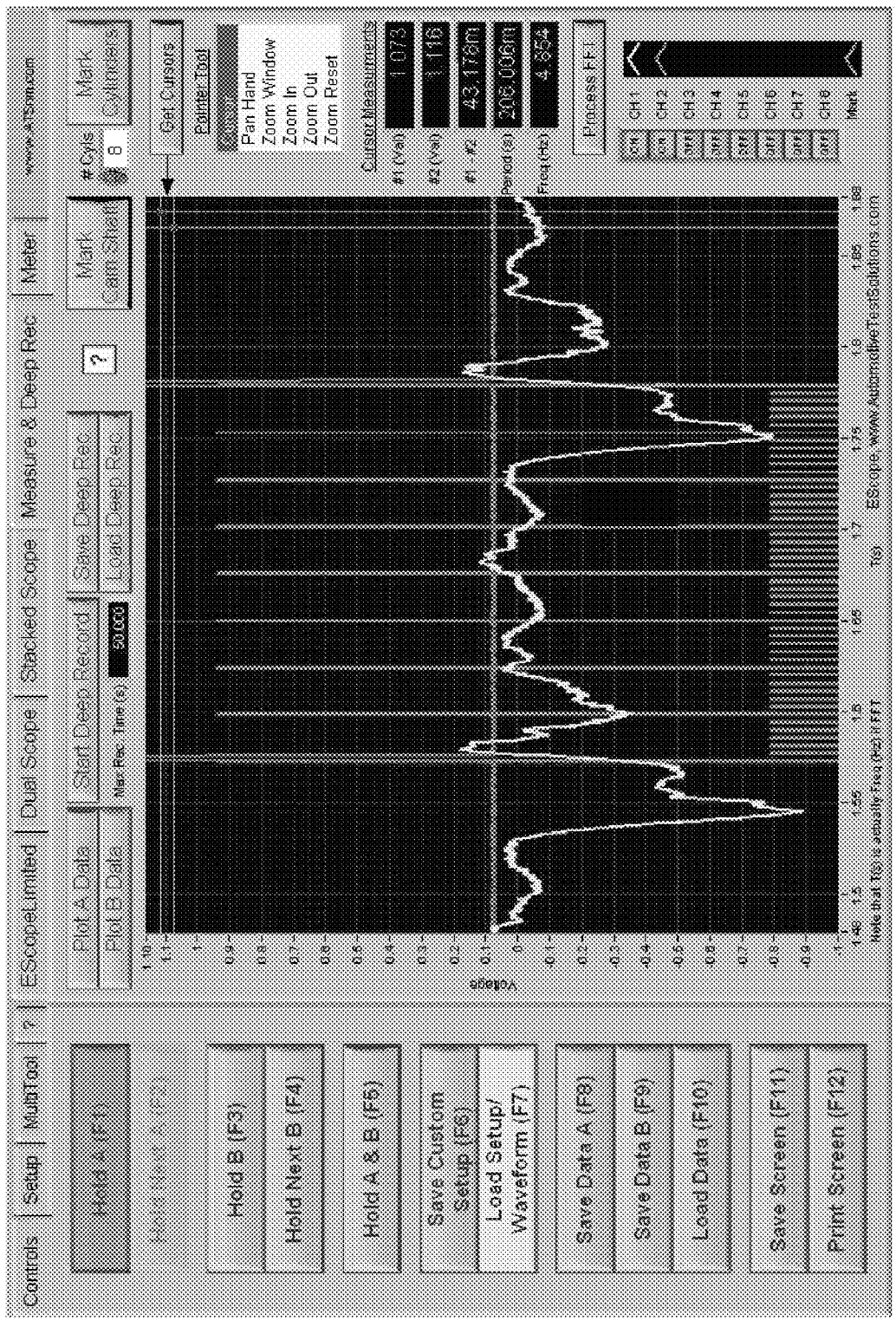
Figure 4I:
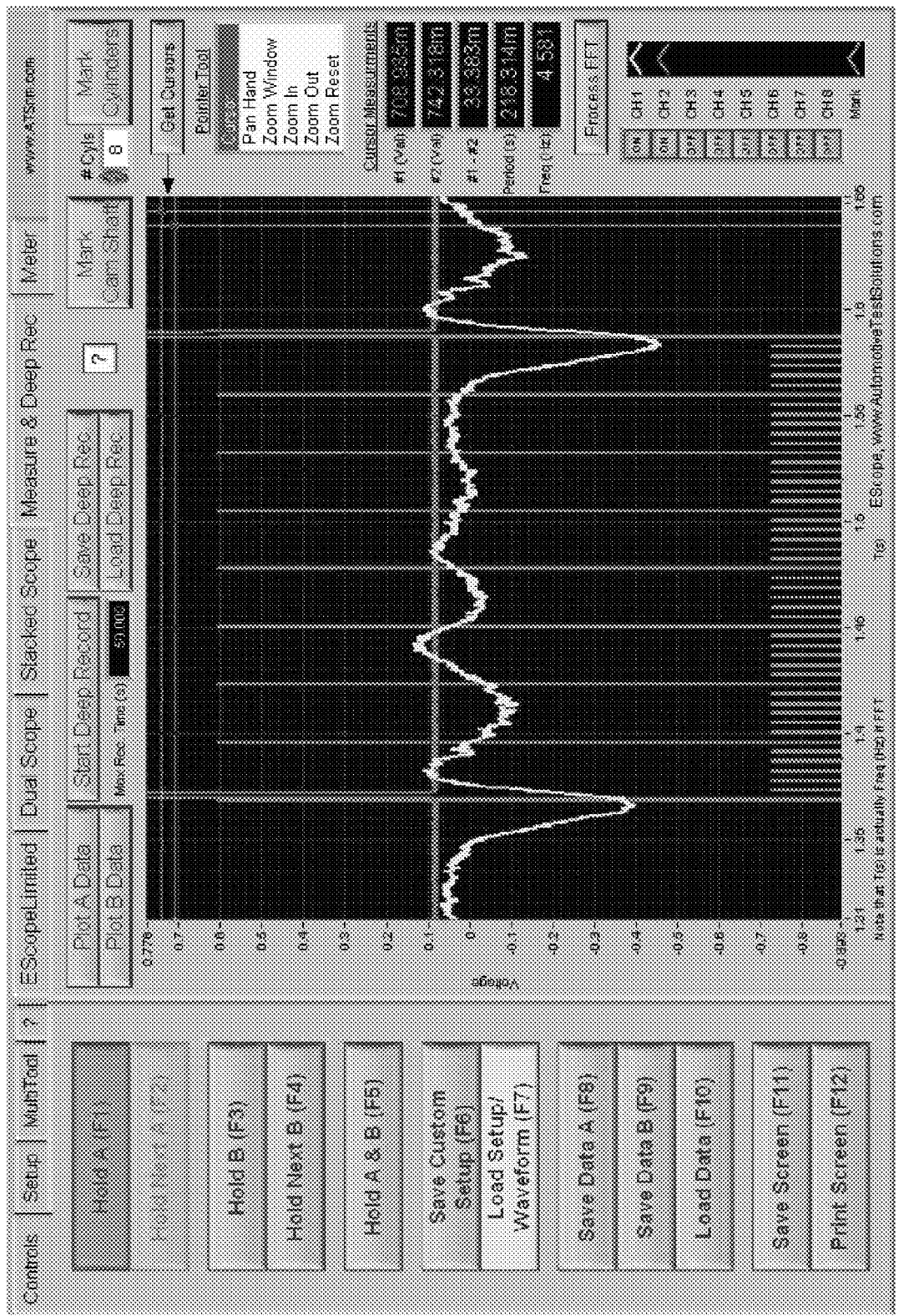
Figure 4J:
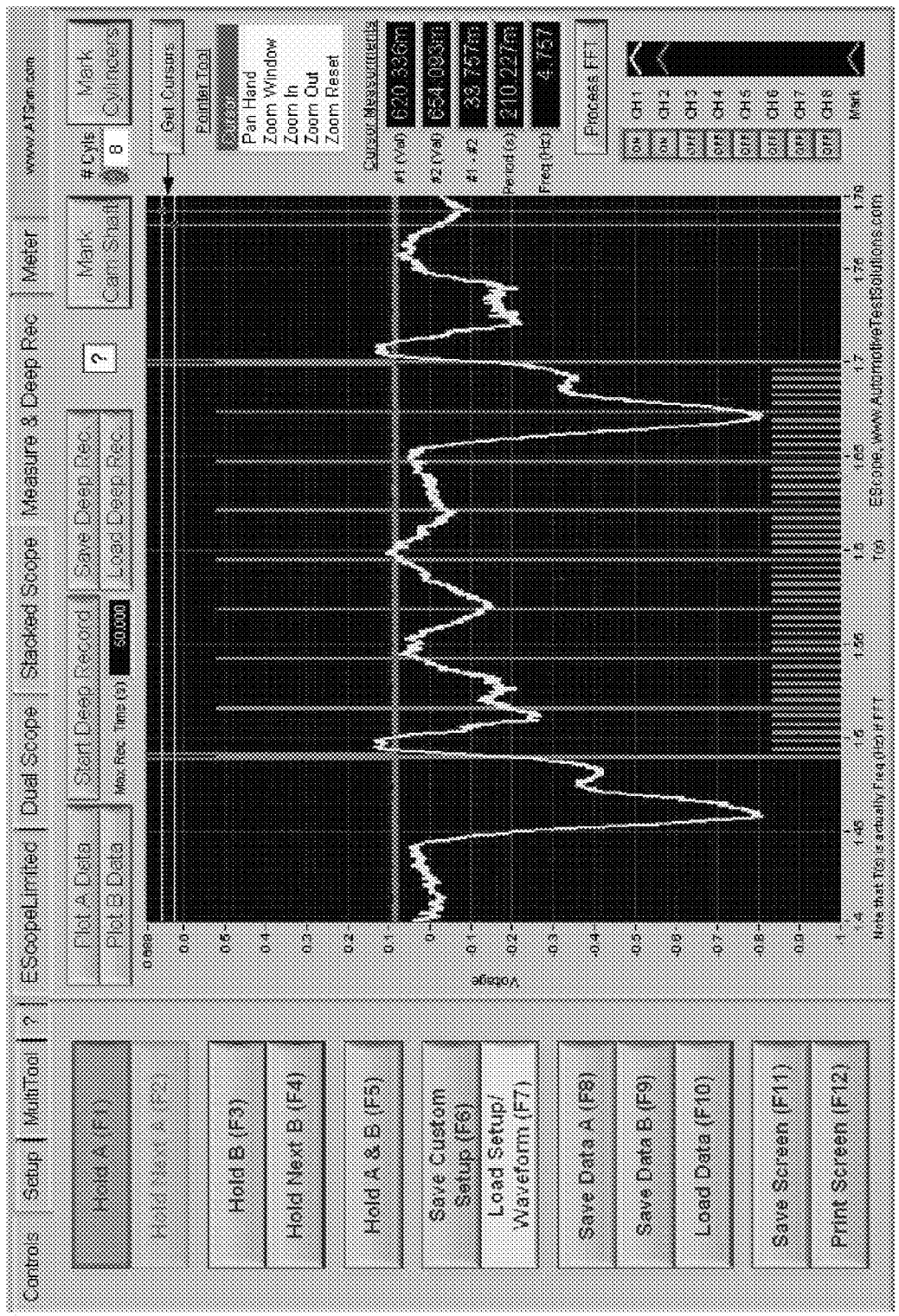
Figure 4K:
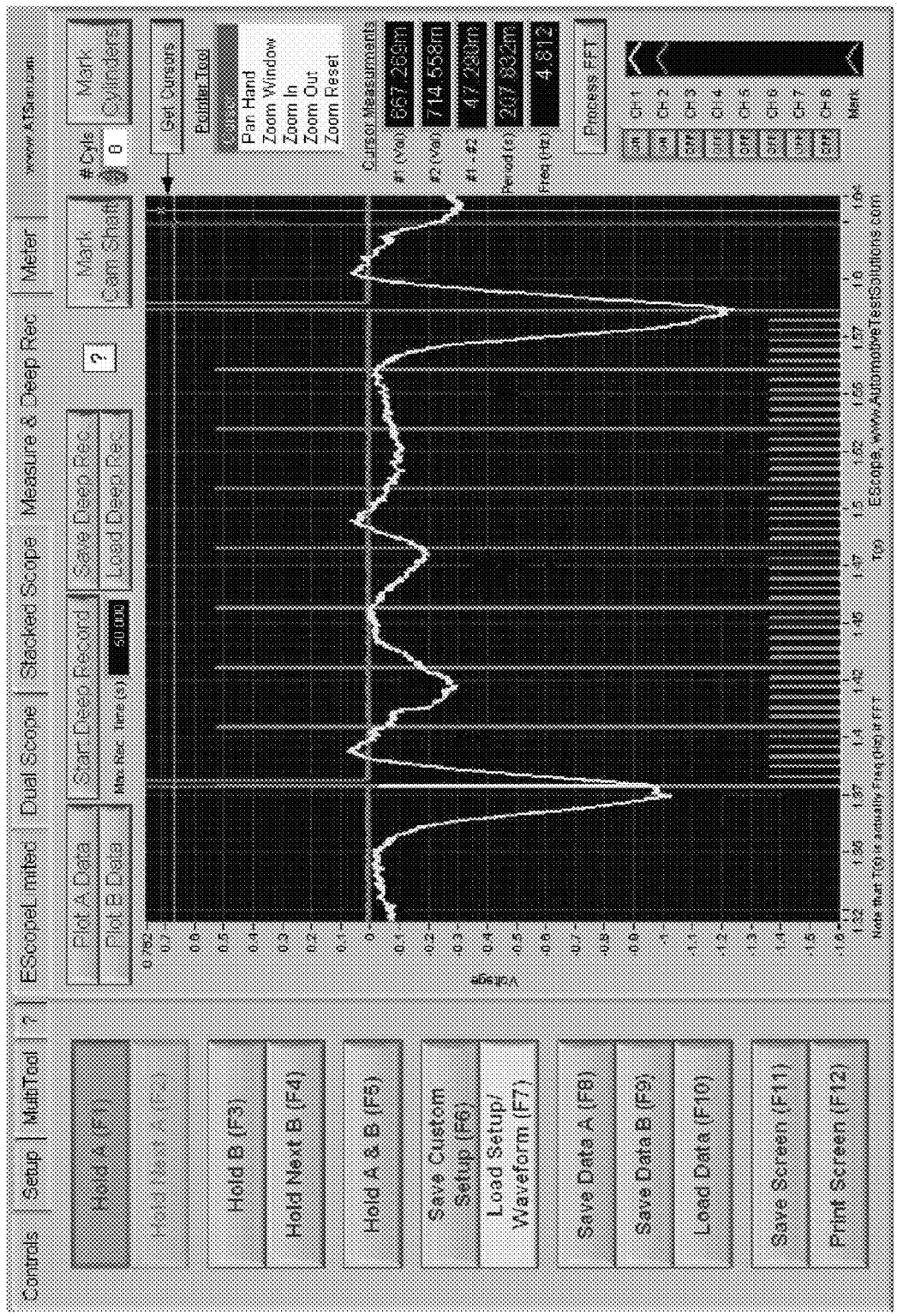
Figure 4L:
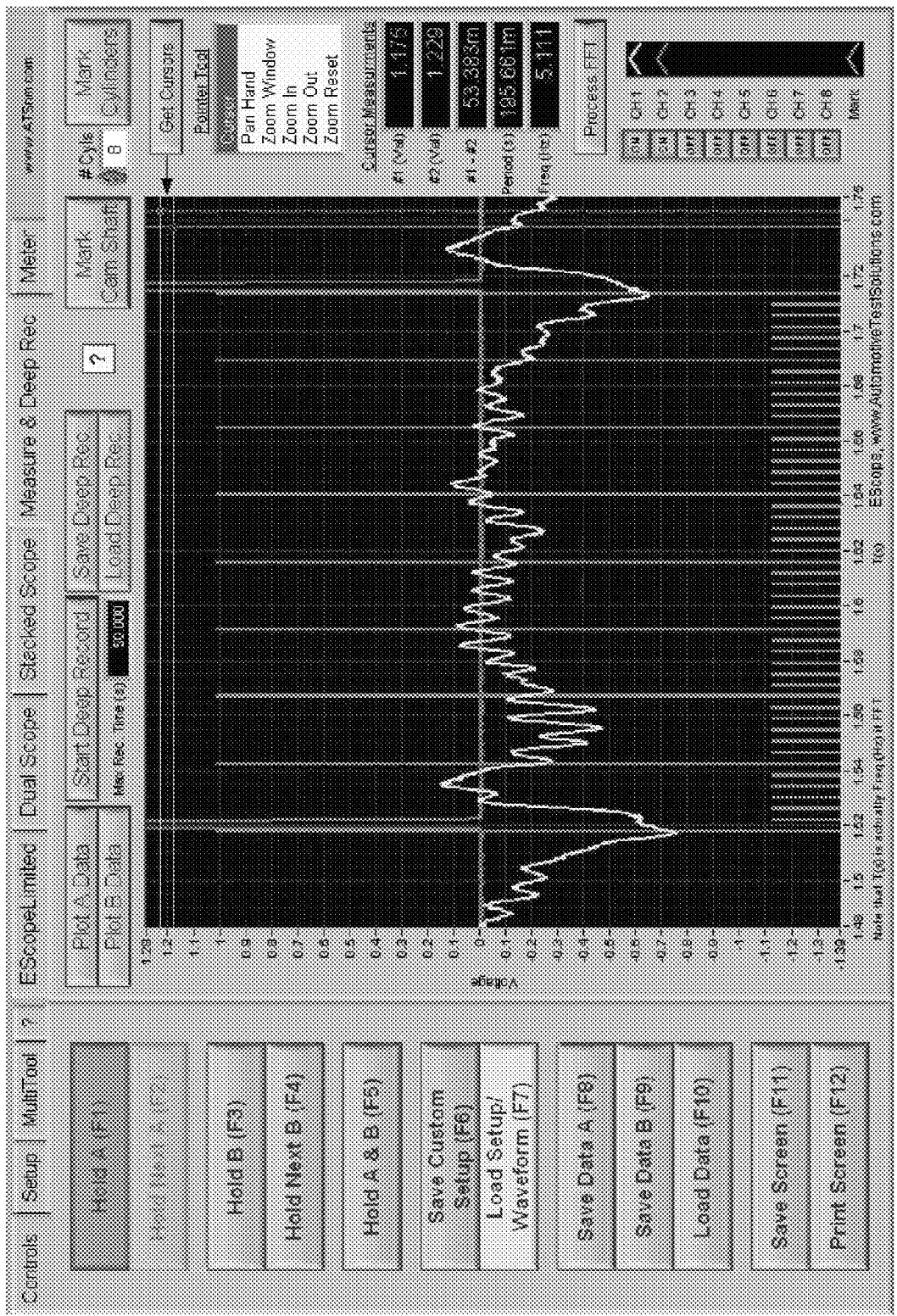
Figure 4M:
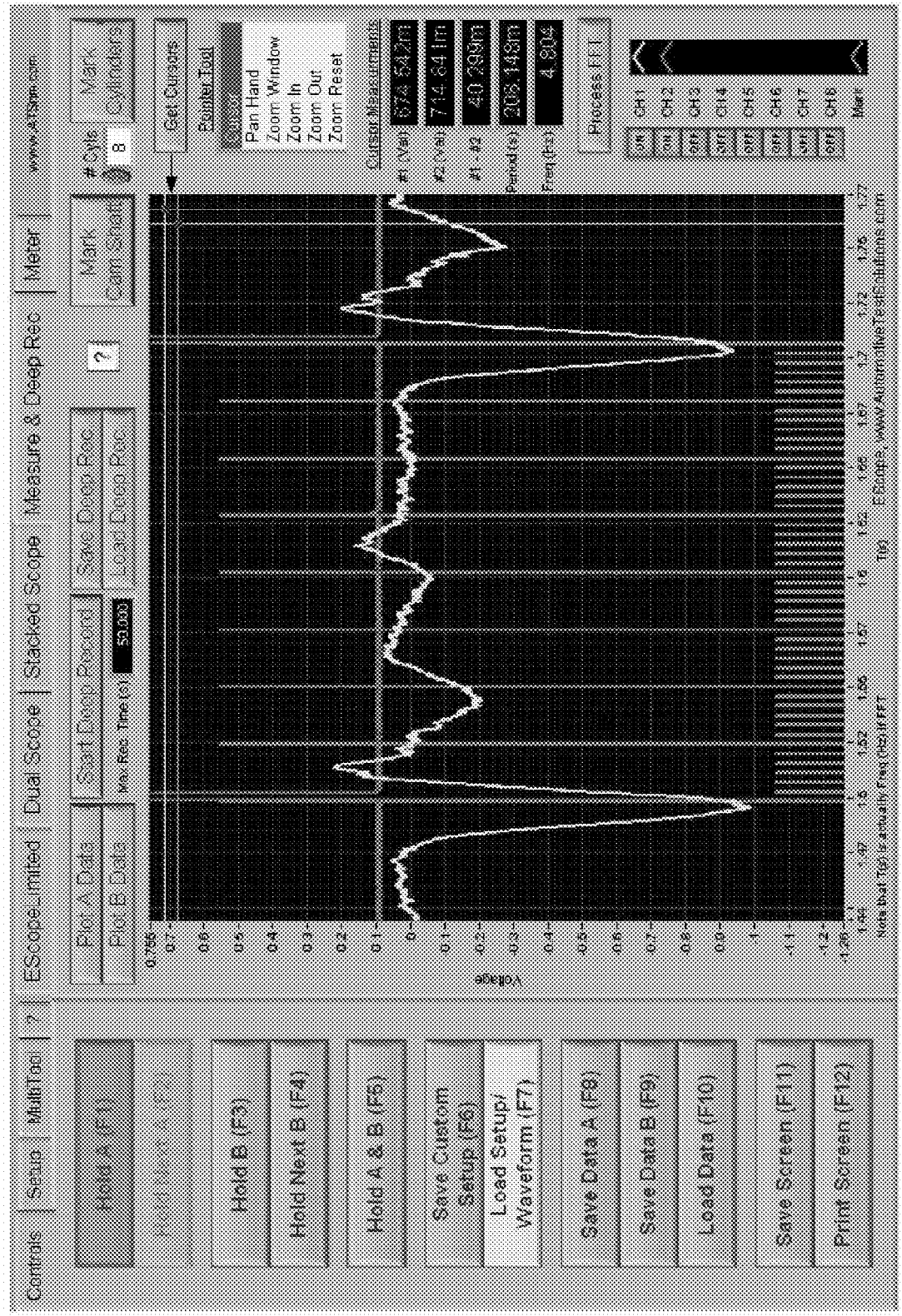
Figure 4N:
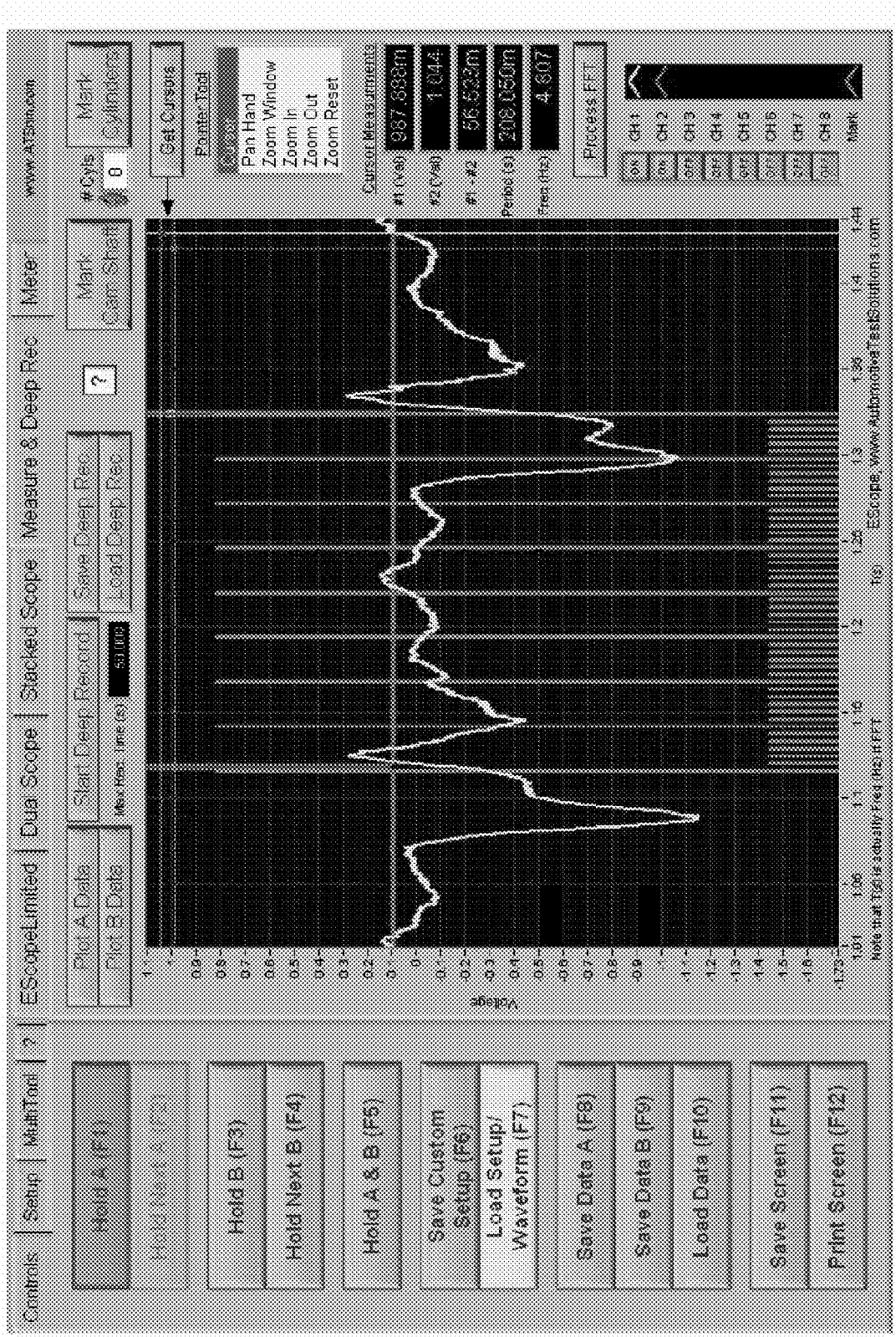
Figure 40:
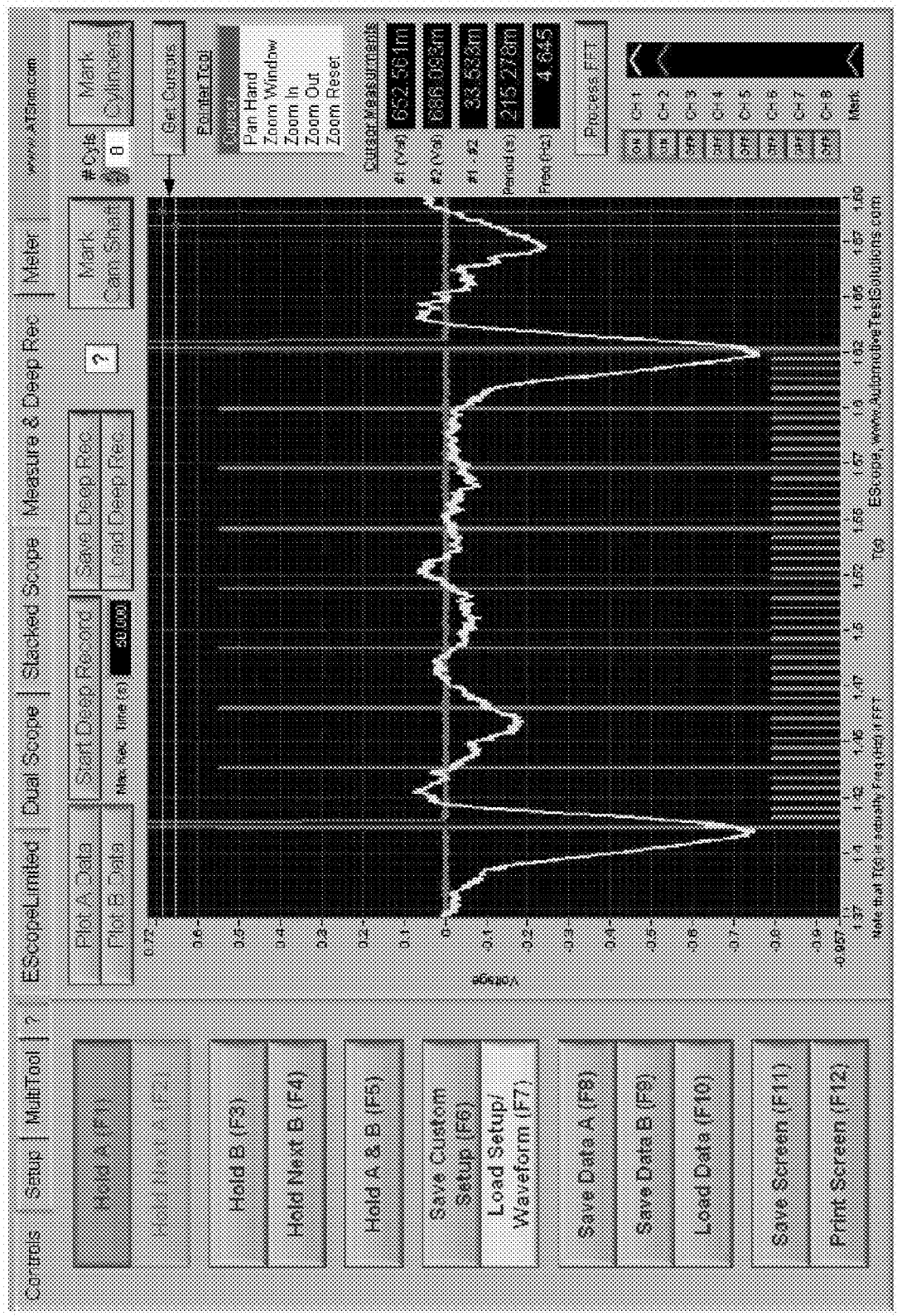
Figure 4P:
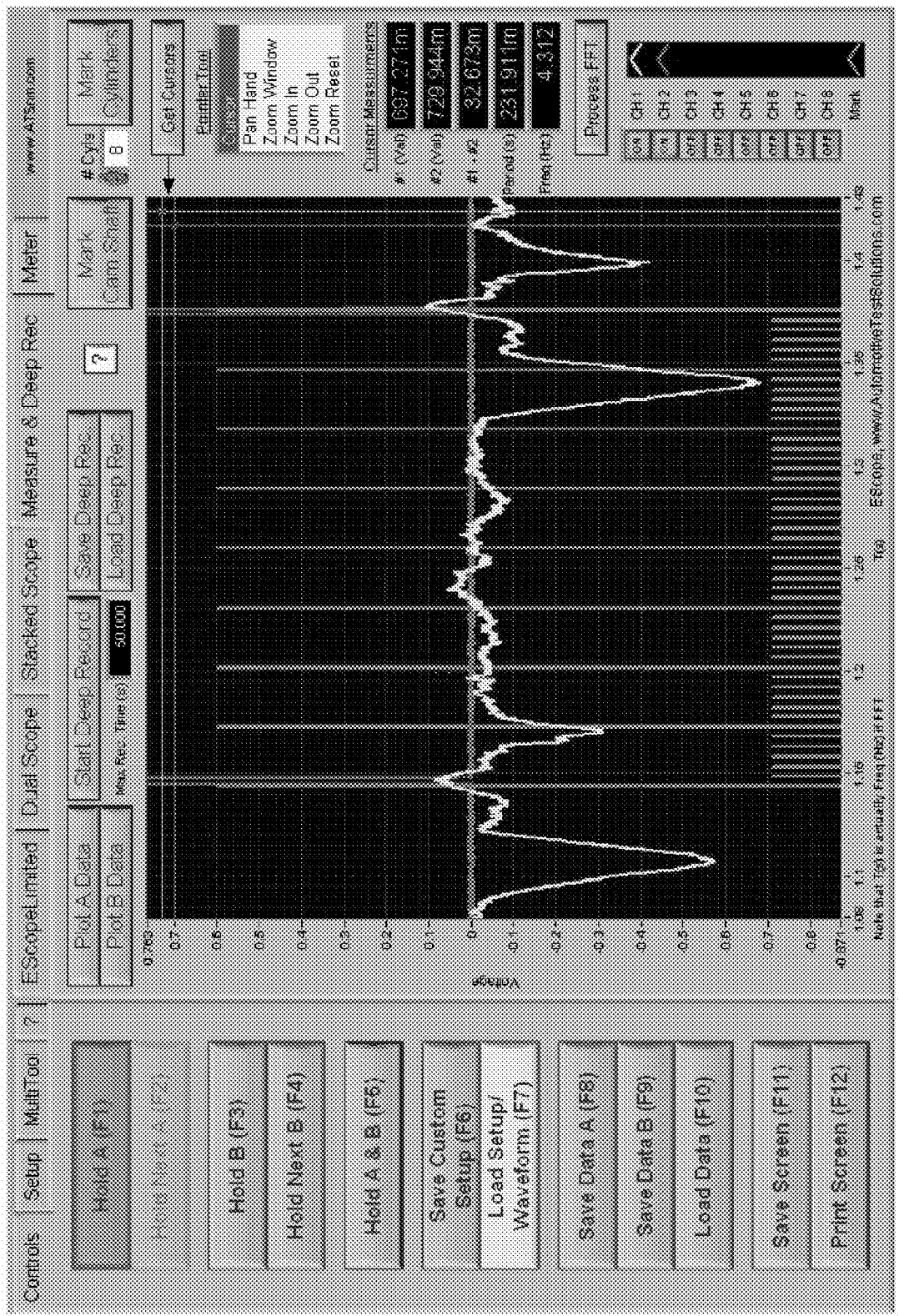
Figure 4Q:
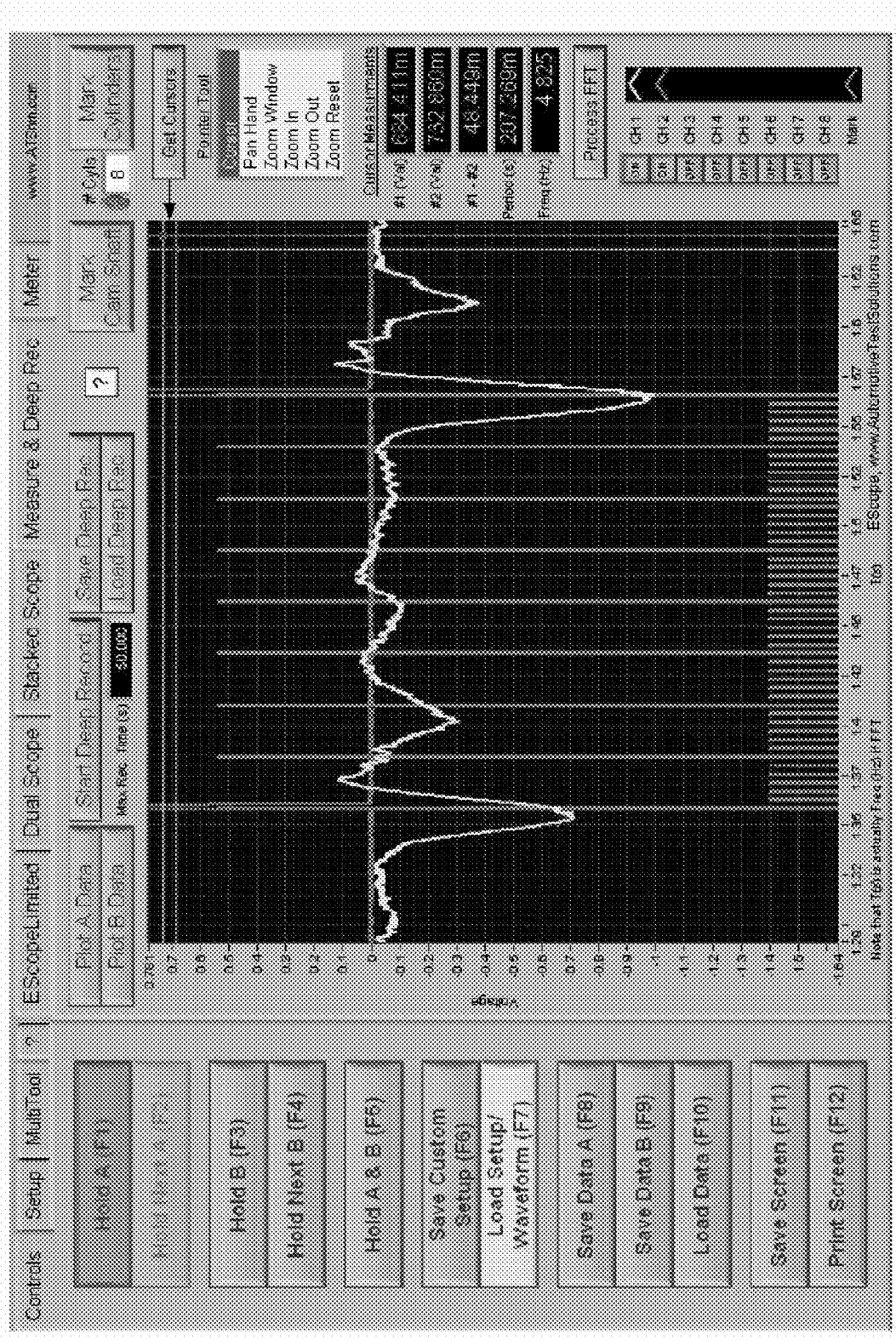
Figure 4R:
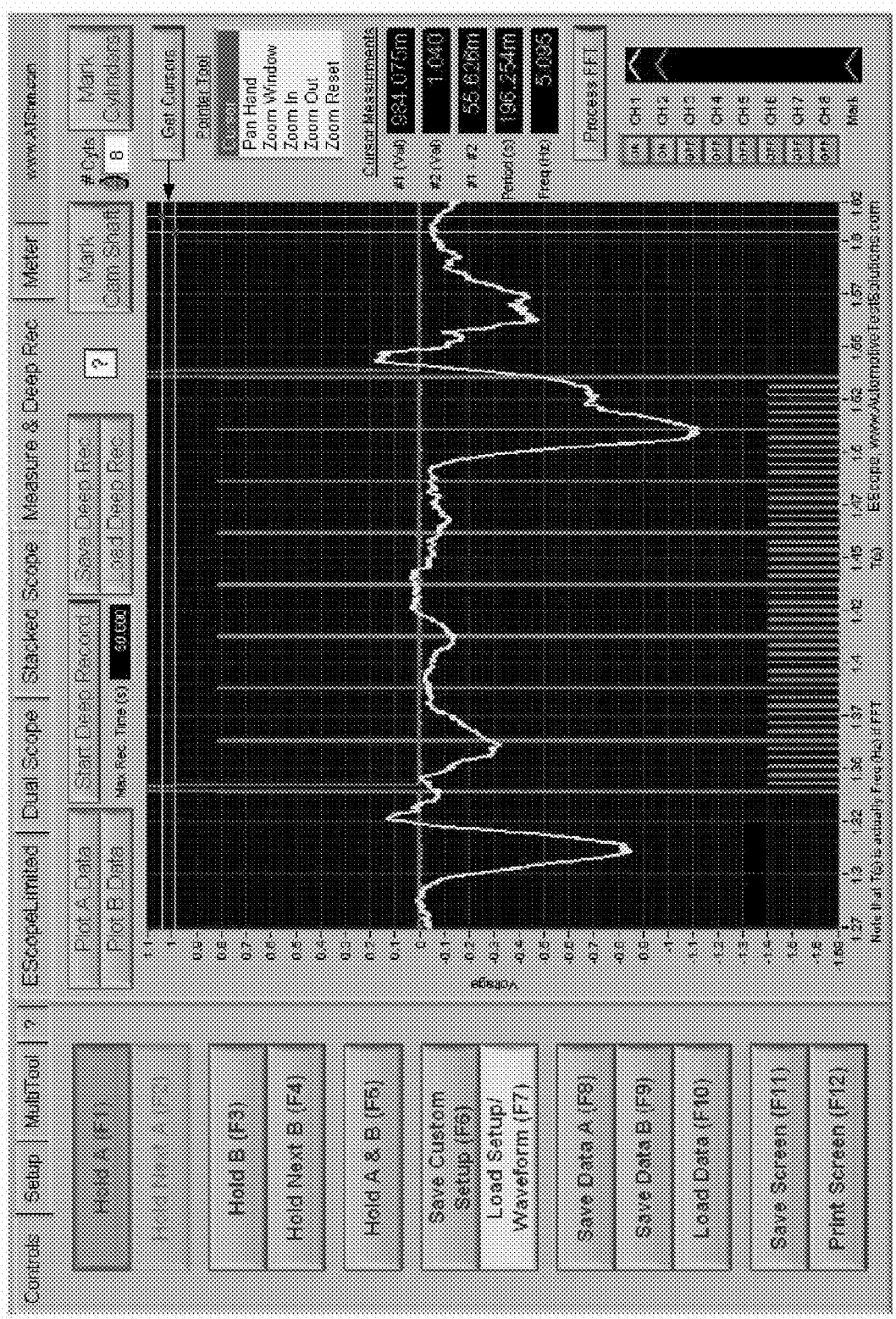
Figure 4S:
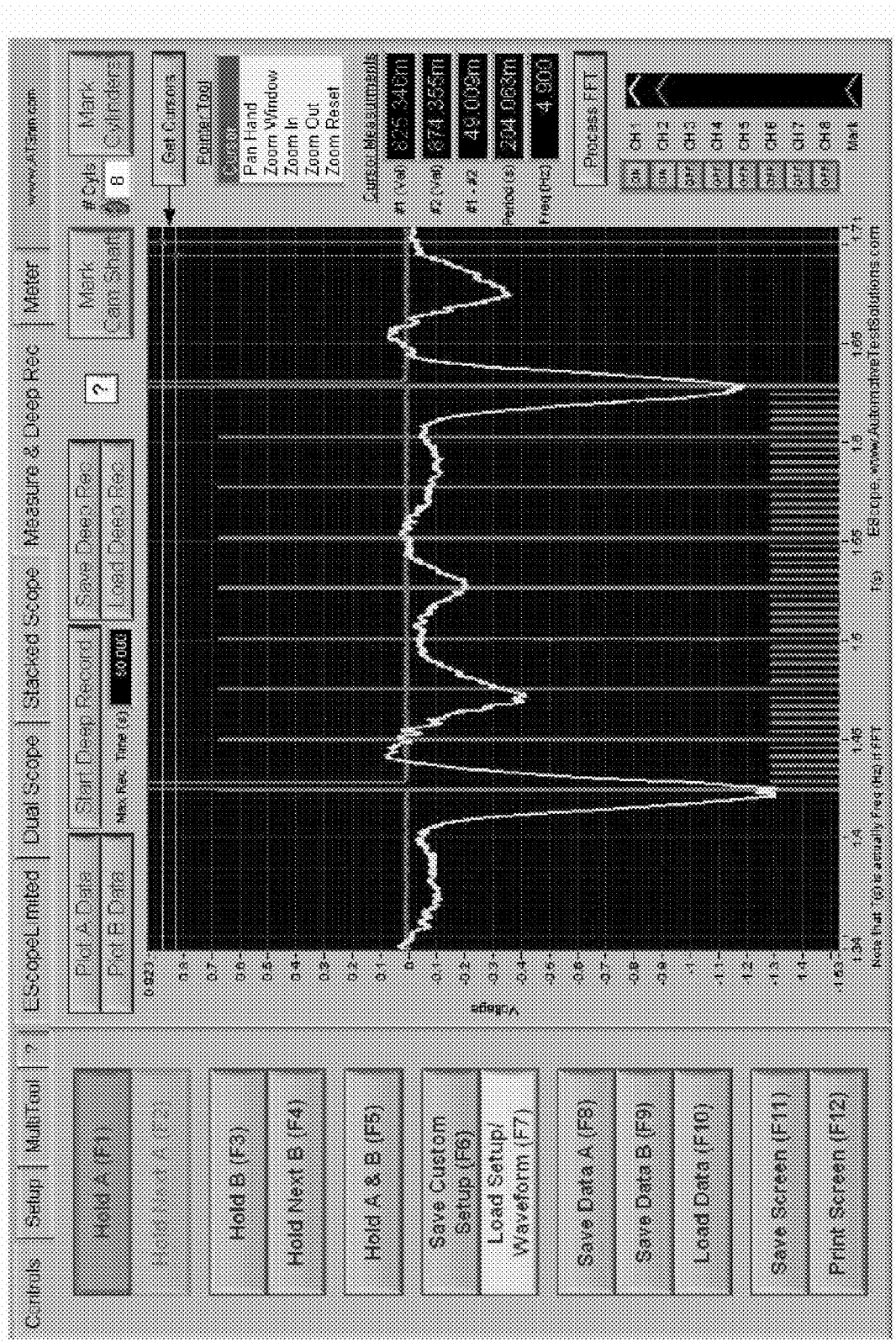
Figure 4T:
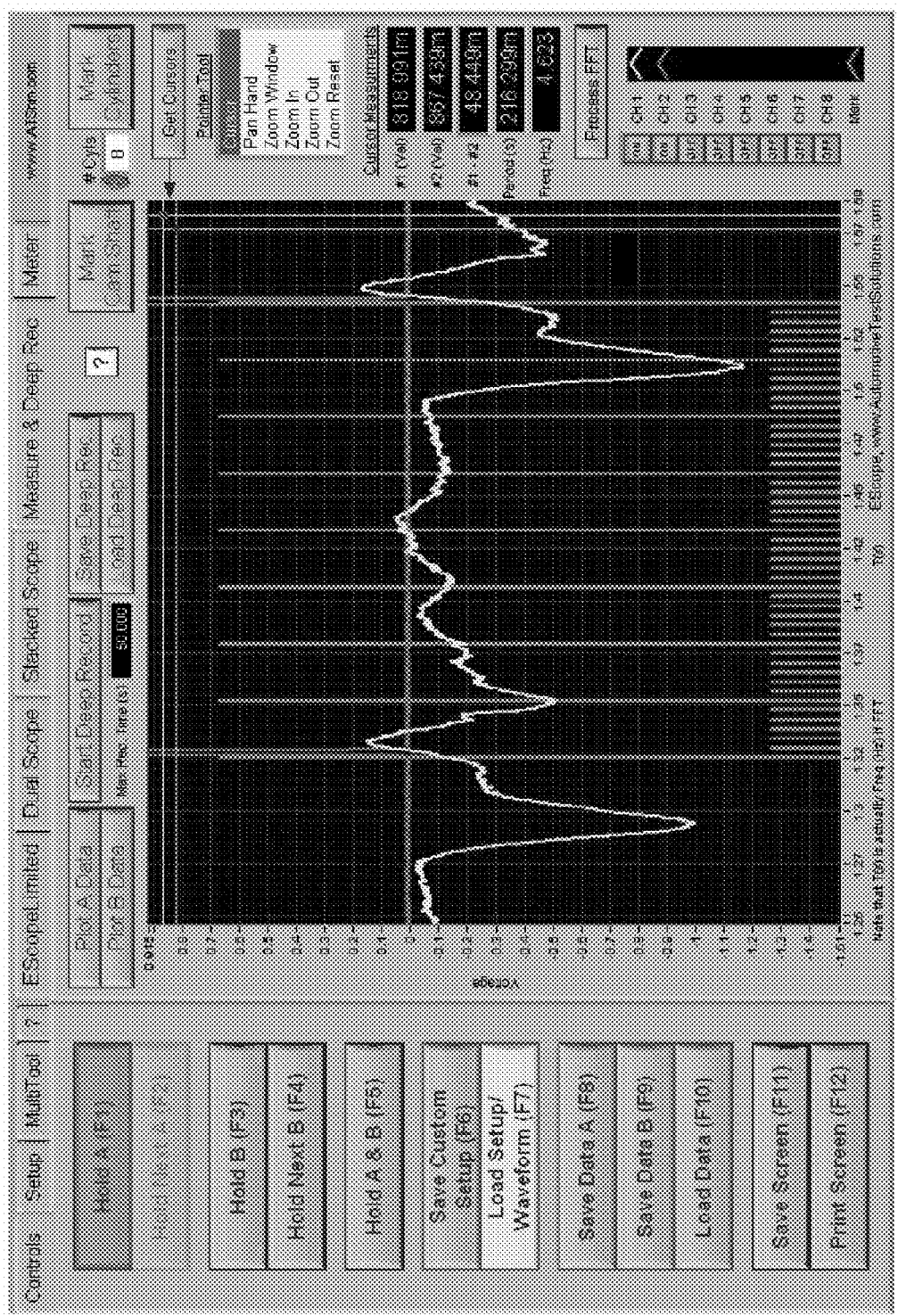
Figure 4U:
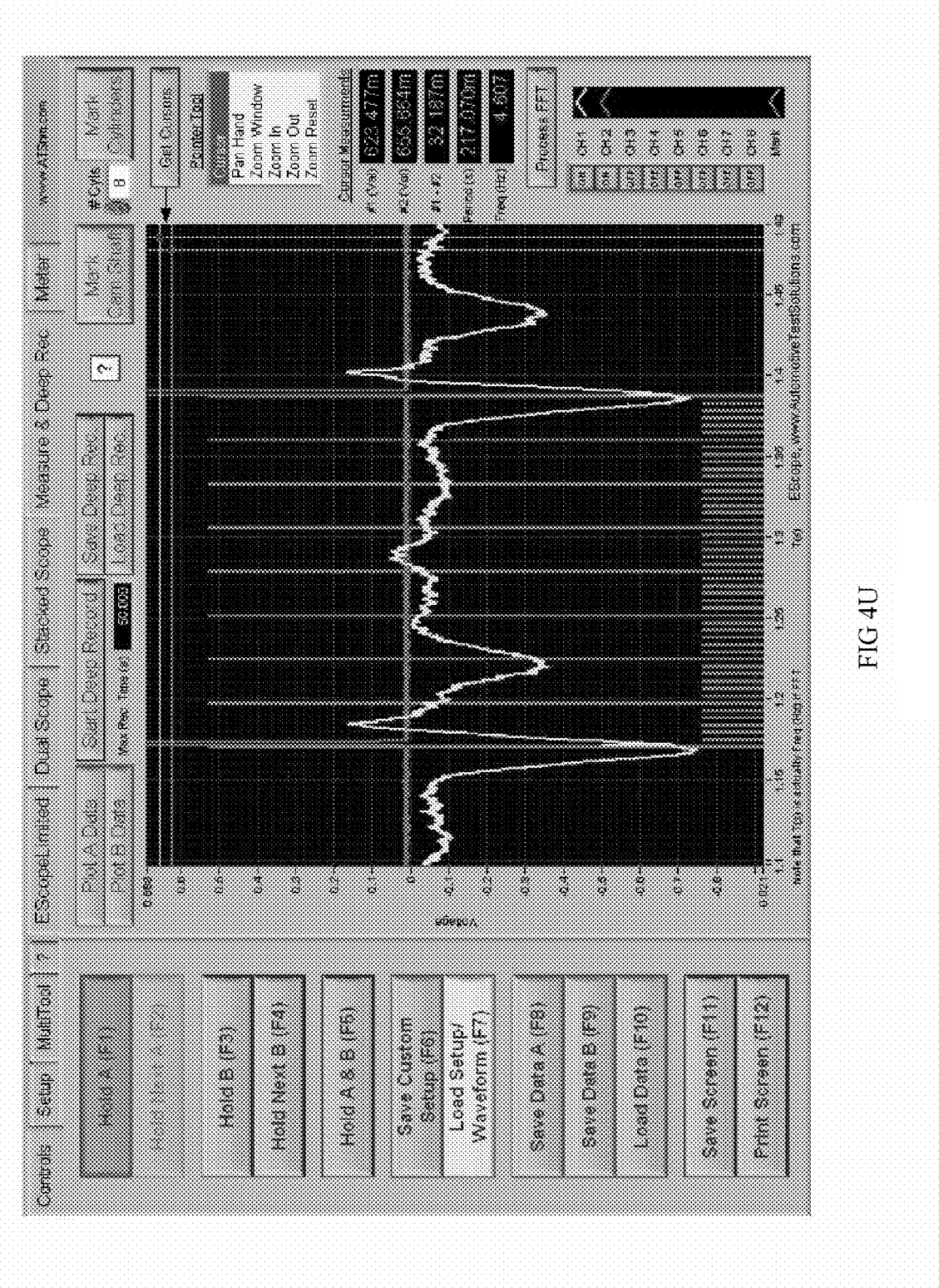
Figure 4V:
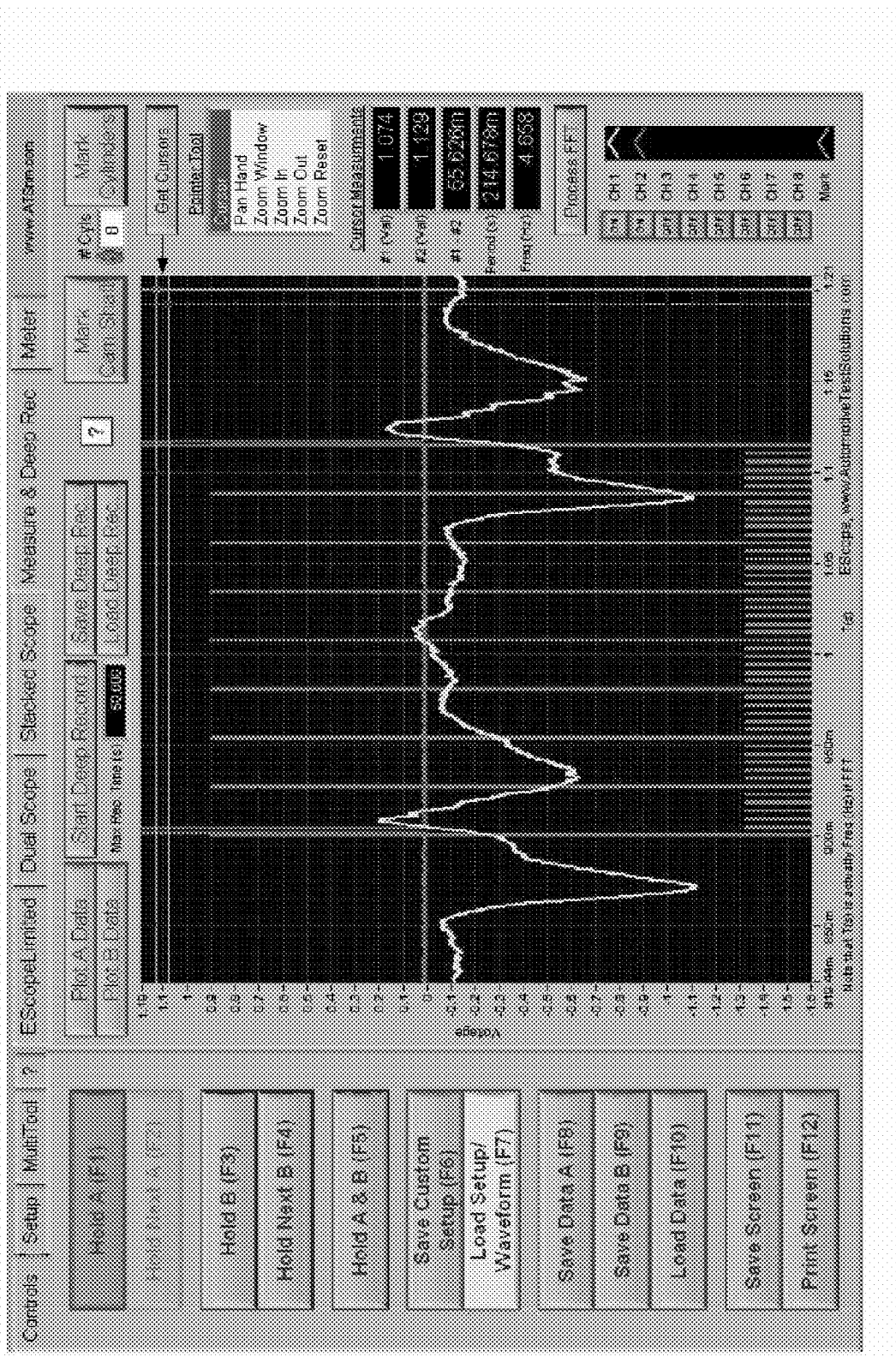
Figure 4:
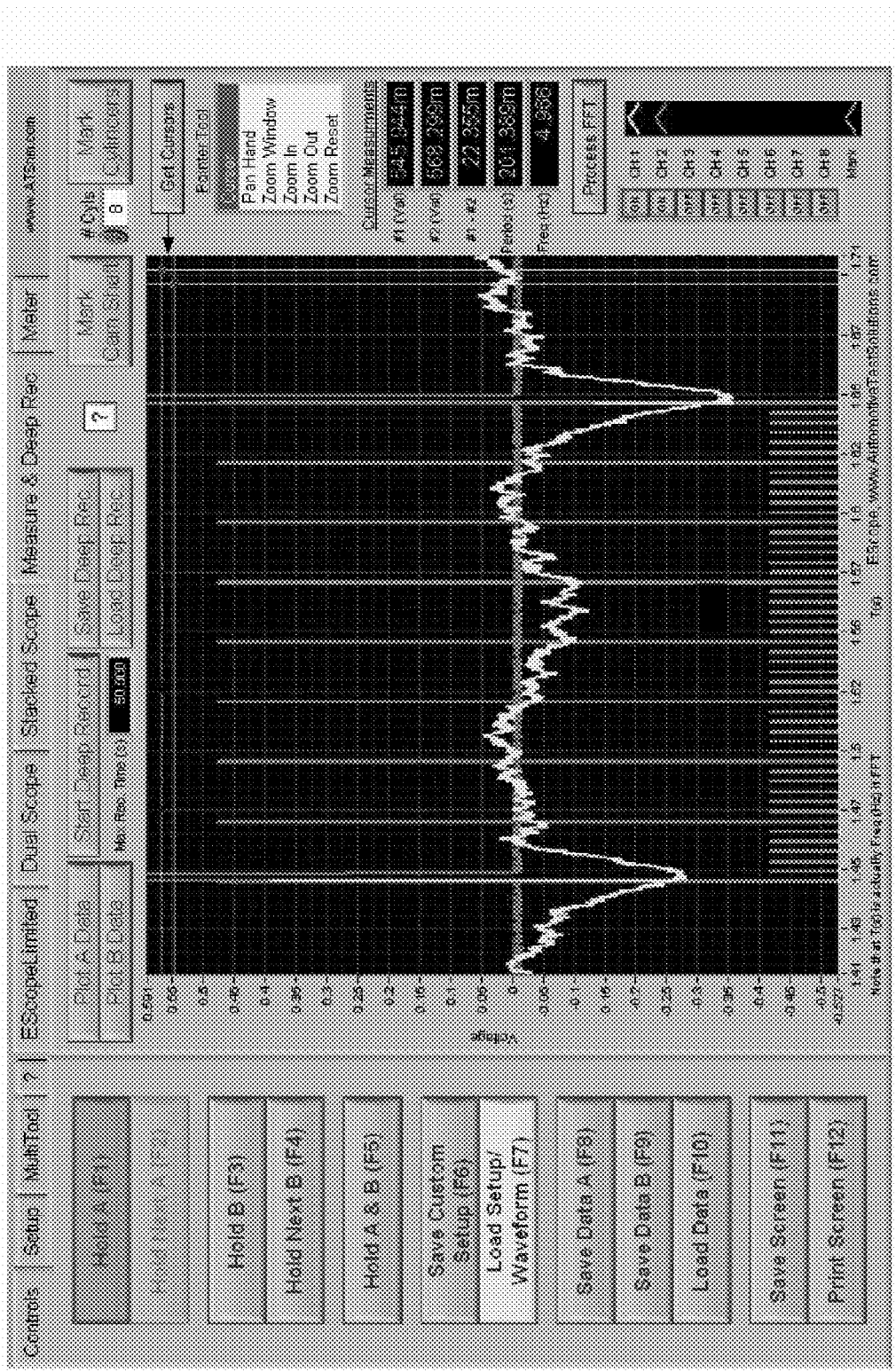
Figure 4X:
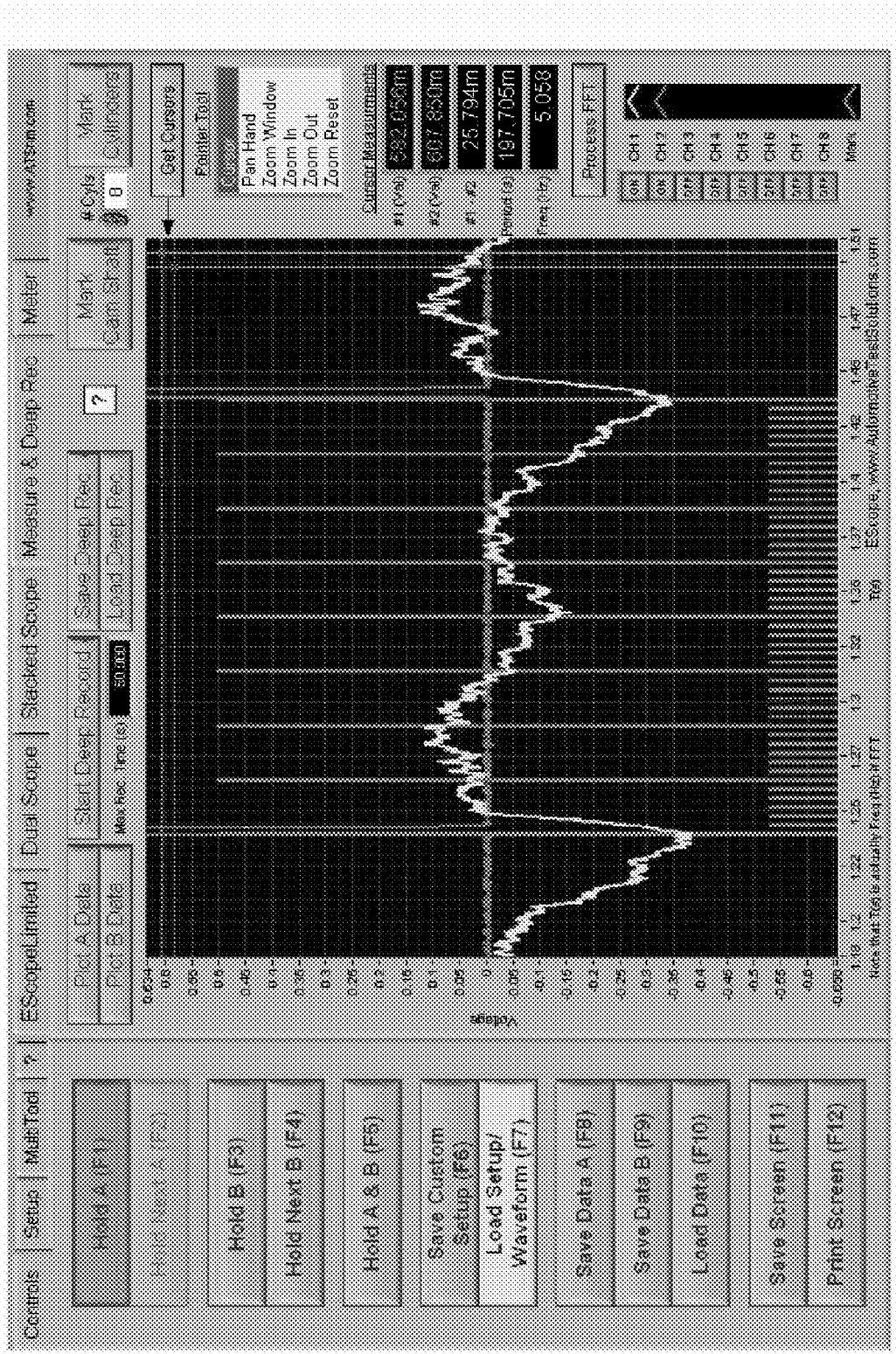
Figure 4Y:
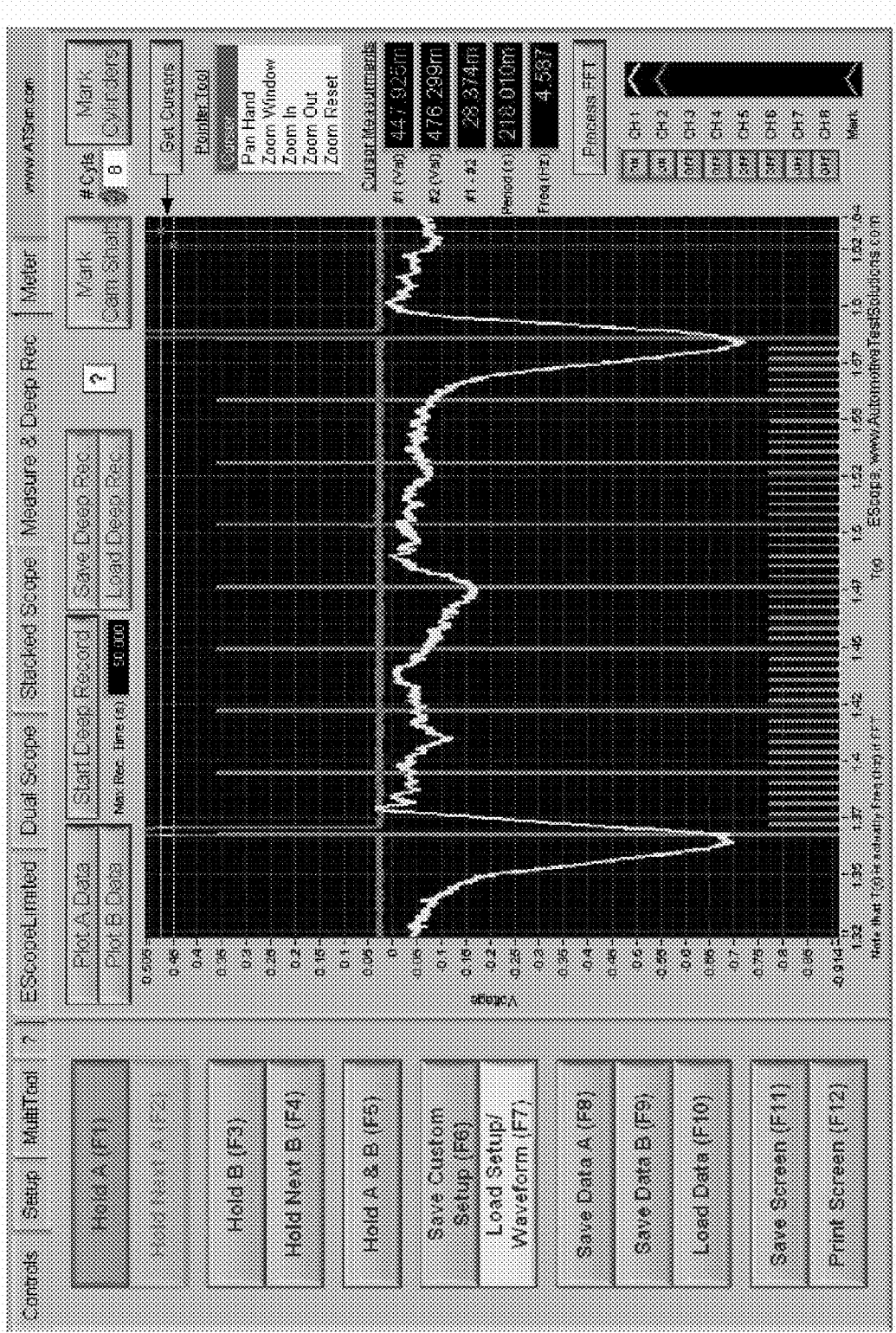
Figure 4Z:
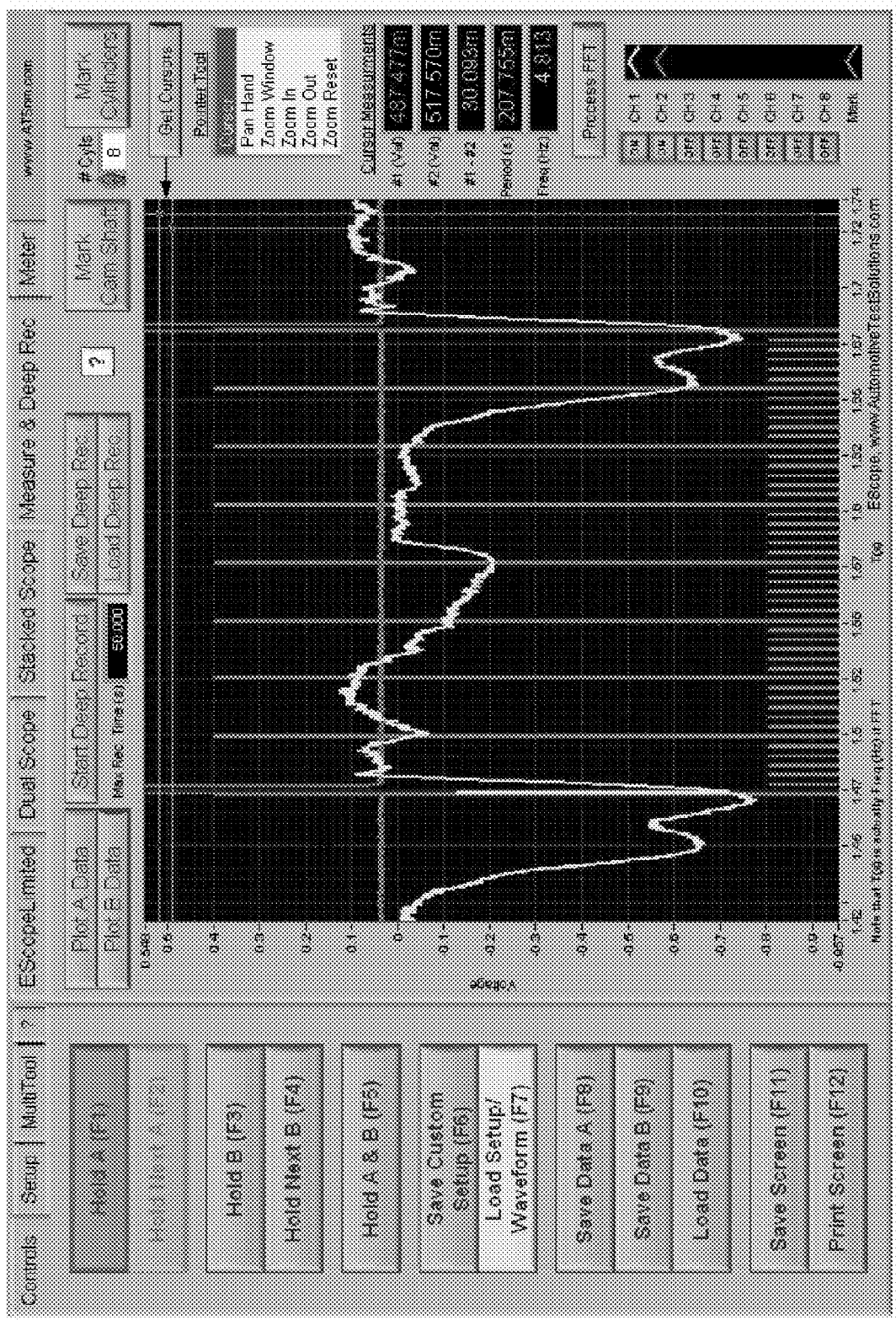
Figure 4A:
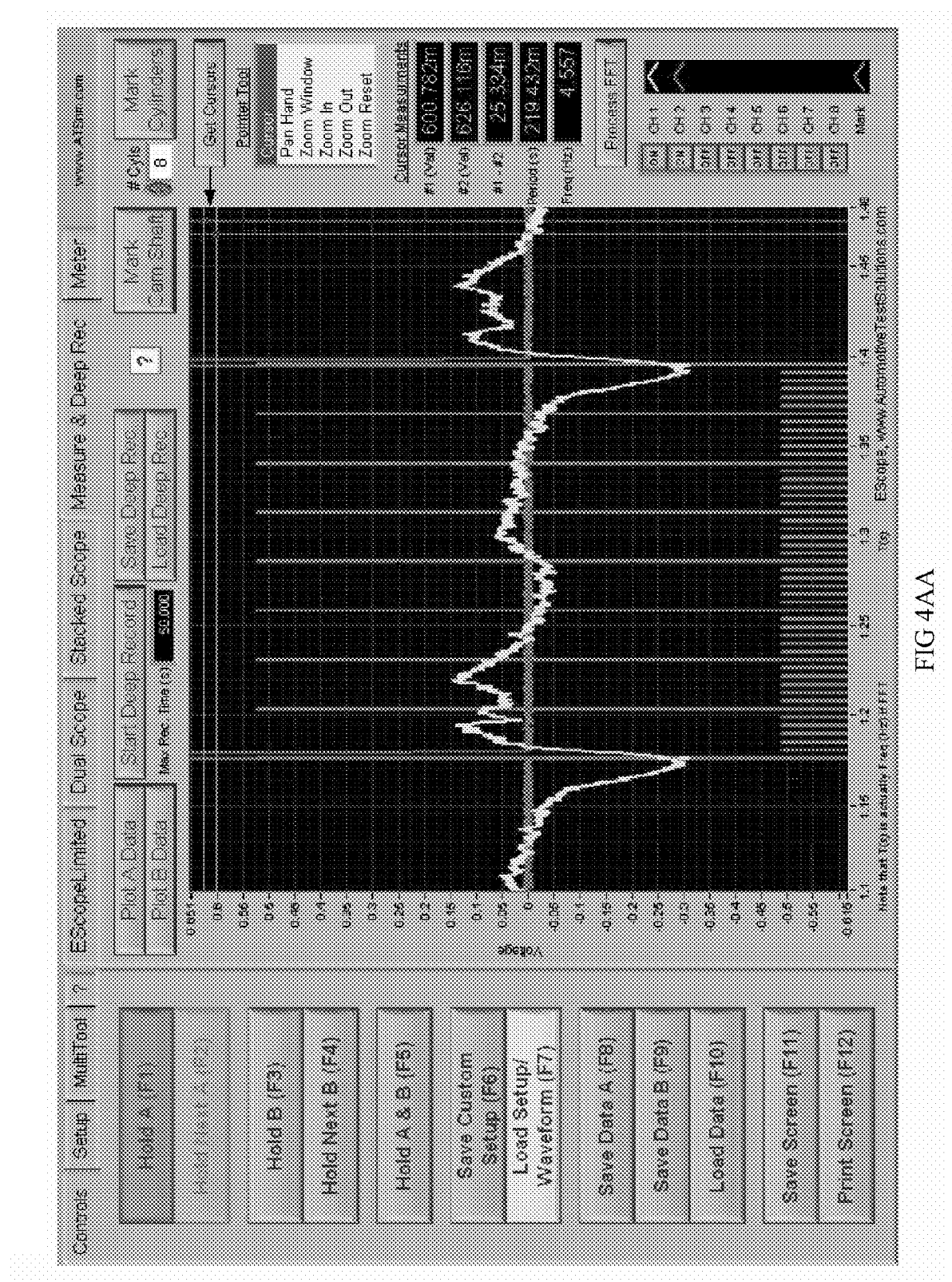
Figure 4B:
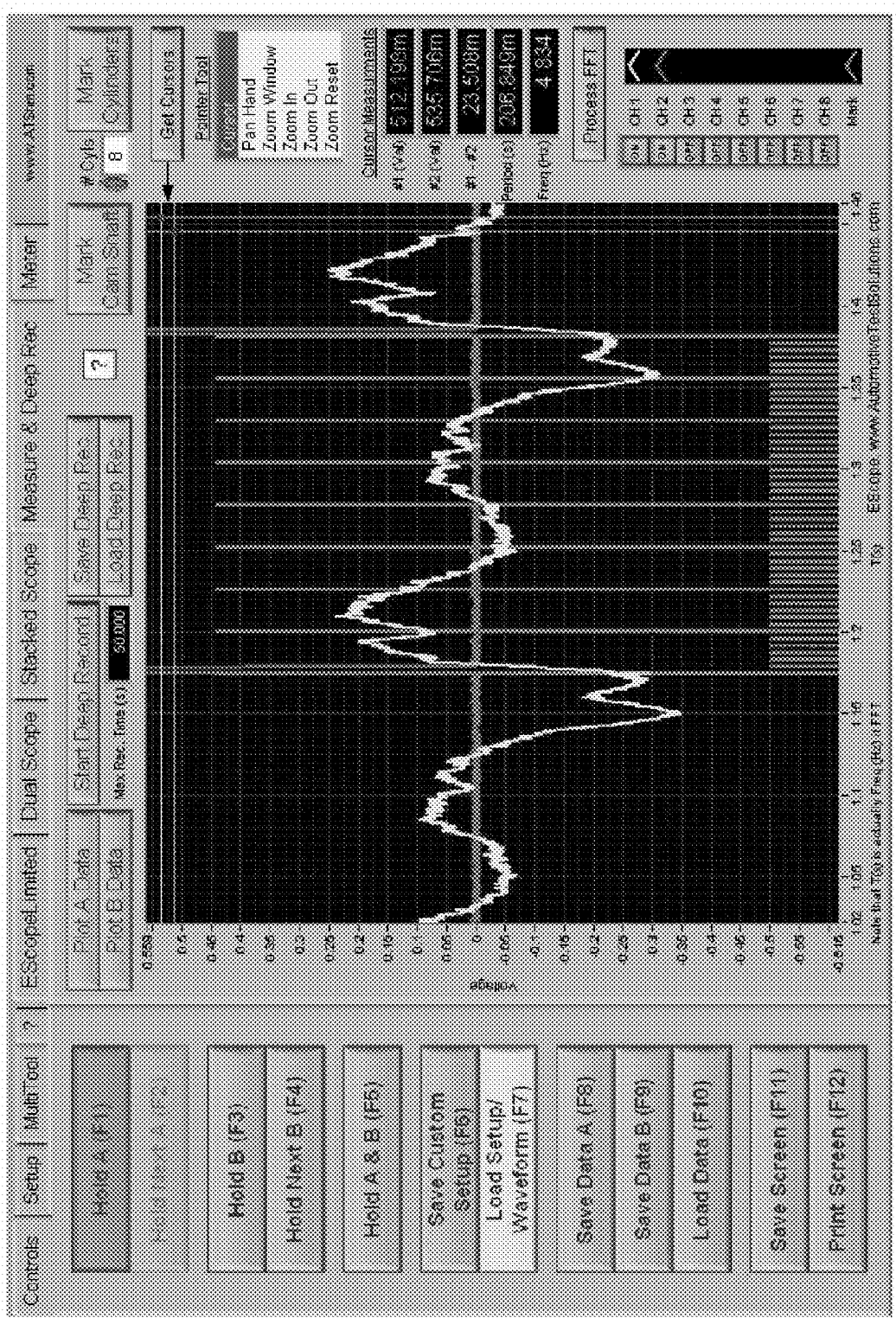

FIGS. 4A through 4BB are screen captures of an oscilloscope displaying the waveform generated by a single-tube embodiment of the present invention under varying conditions and variables as noted in the text.

FIGS. 5A and 5B are screen captures of an oscilloscope displaying the waveform generated by a prior art Senx™ probe.

Figure 6A:
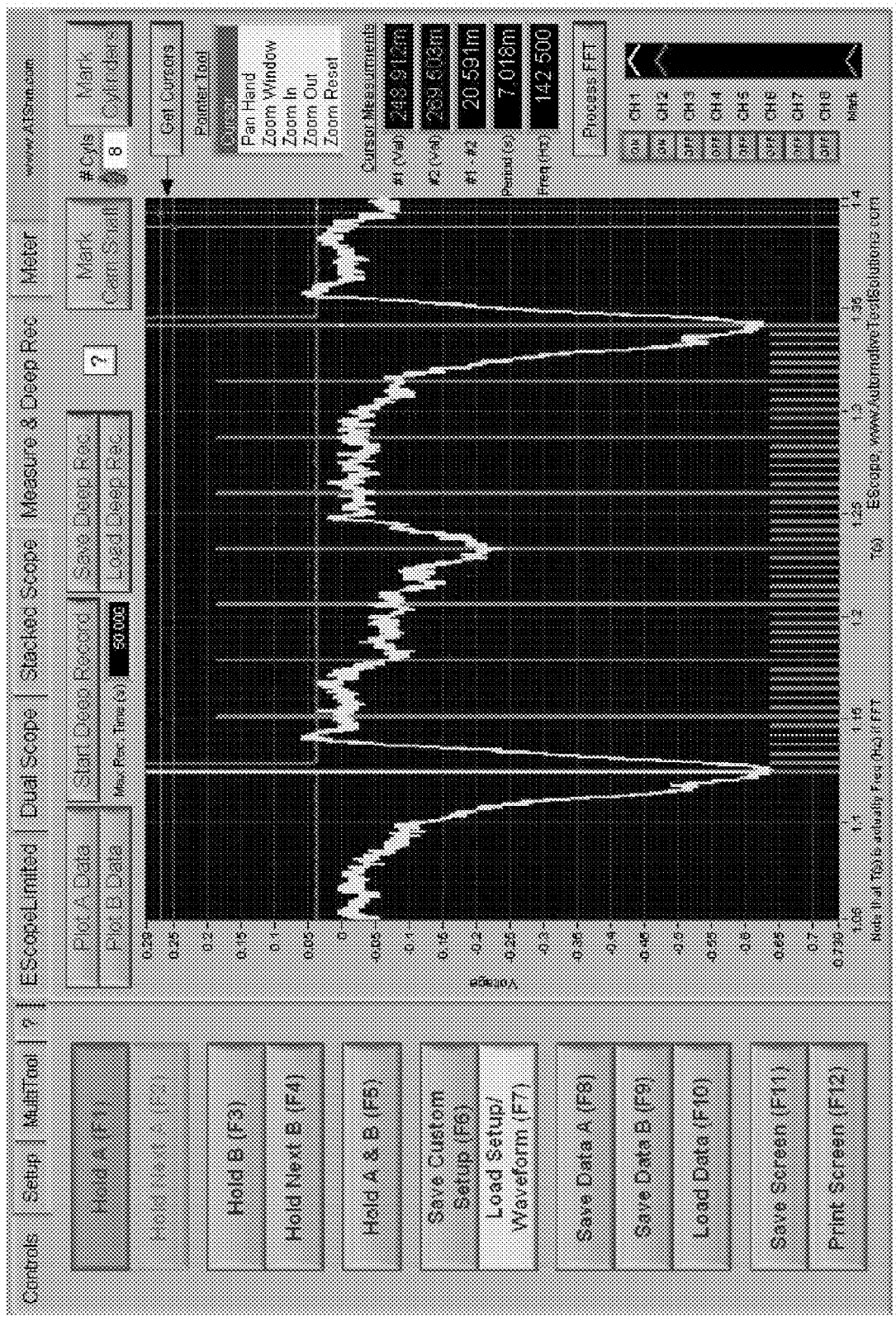
Figure 6B:
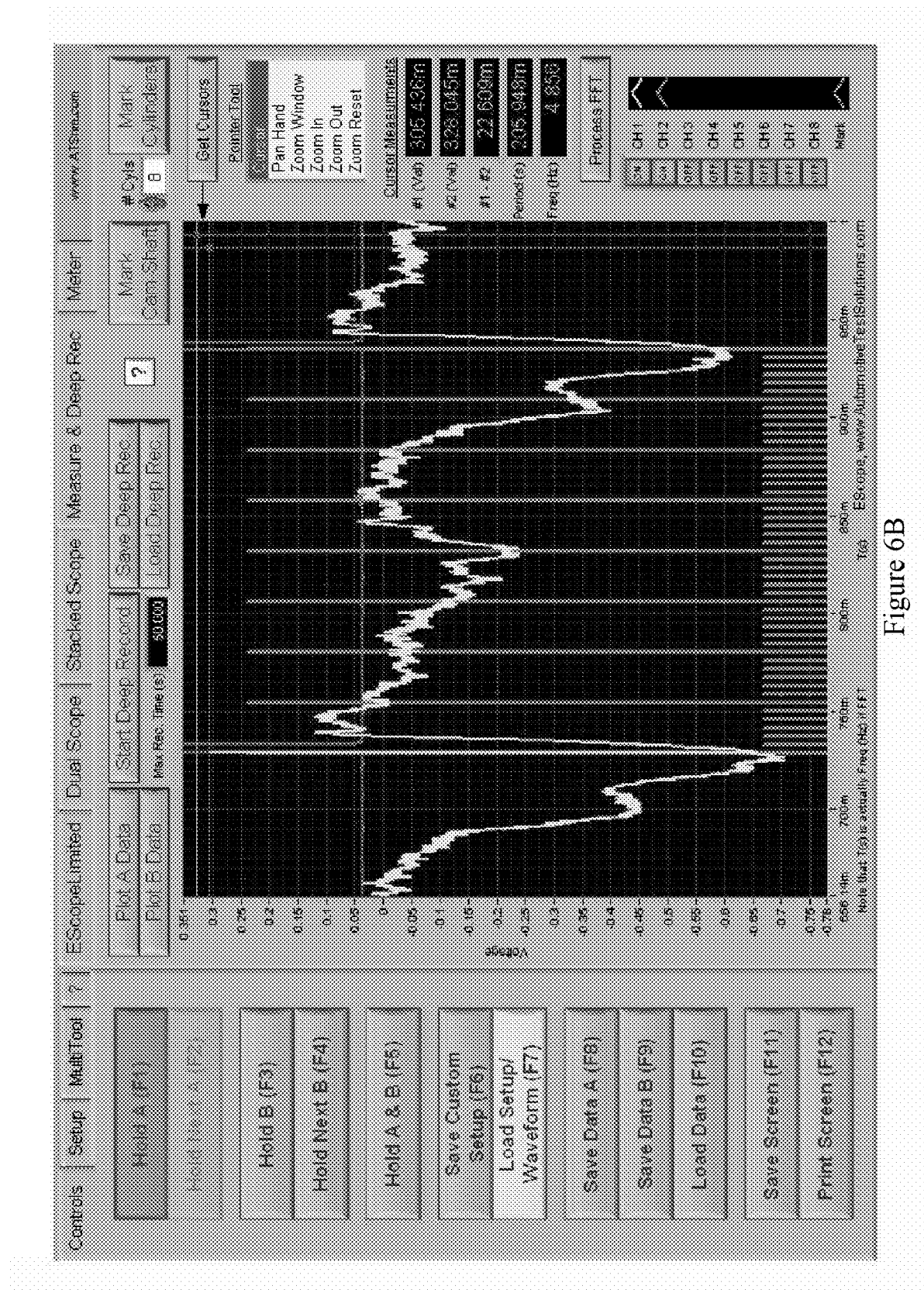

FIGS. 6A and 6B are screen captures of an oscilloscope displaying the waveform generated by the preferred double-tube embodiment of the present invention.

DESCRIPTION OF PREFERRED EMBODIMENT OF THE INVENTION

Figure 1:
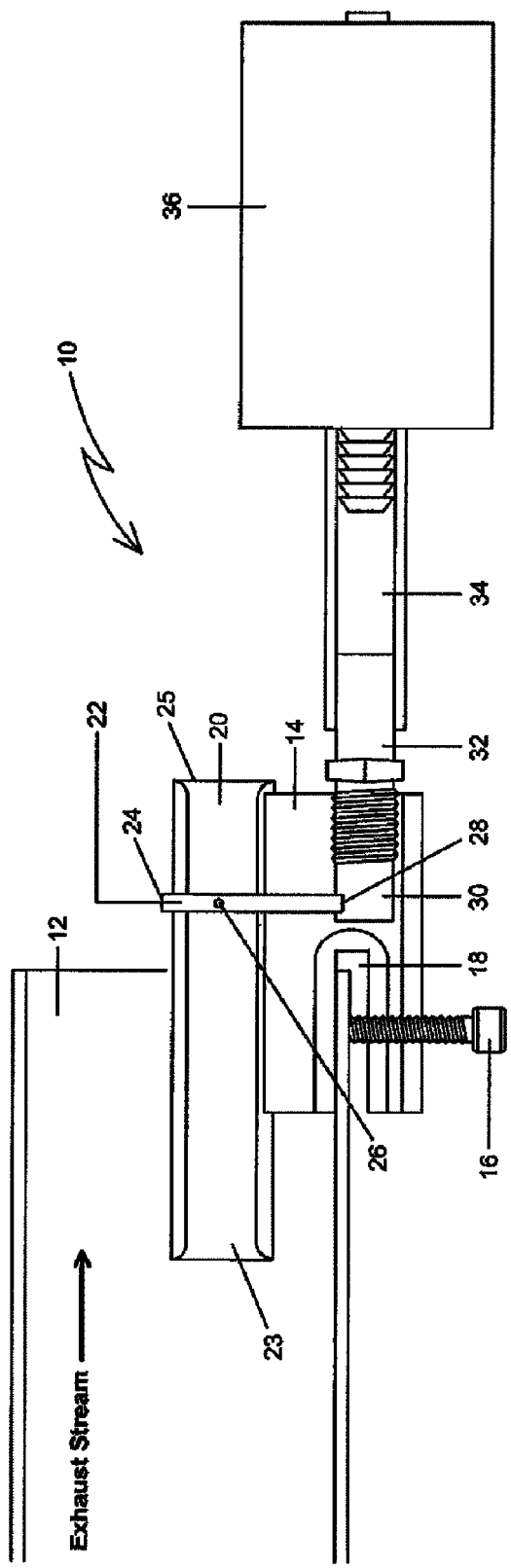
FIG. 1 is a side, partially cross-sectioned, view of a single-tube embodiment of the present invention wherein some hidden features are visible.

With reference to the figures, the present invention will be described by first discussing a single-tube embodiment and then describing the preferred double-tube embodiment. As shown in FIG. 1, the first embodiment is misfire probe 10 that is placed in the exhaust stream of an engine (not depicted). For example, probe 10 may be located at the end of tailpipe 12 of the exhaust system. Probe 10 is attached to tailpipe 12 via U-shaped Venturi base 14 and tail pipe lock bolt 16. Venturi base 14 is slid onto tailpipe 12 such that a portion of the tailpipe wall slides into U-shaped cavity 18 of Venturi base 14. Tail pipe lock bolt 16 is aligned perpendicular to cavity 18 such that it may be turned to clamp down on the portion of tailpipe 12 slid into cavity 18. Venturi tube 20 is horizontally mounted onto Venturi base 14 such that a first end 23 of tube 20 is located within tailpipe 12 and a second end 25 of tube 20 is located outside of tailpipe 12. Sensing tube 22 vertically extends from base 14 through tube 20 and is closed at the top 24 of sensing tube 22. Sensing tube 22 has an aperture 26 located within Venturi tube 20. The bottom 28 of sensing tube 22 is open and extends through one end of fitting 32 that is inserted into a cavity within Venturi base 14, resulting in sensing chamber 30. The other end of fitting 32 is connected to sensor connection hose 34, which in turn connects to exhaust sensor 36—preferably an electrical pressure transducer. In one alternative embodiment, the pressure transducer may be integrated into Venturi base 14 rather than connecting to base 14.

By placing probe 10 in the exhaust stream, the exhaust pulsation (generated by the firing cylinders) can be monitored. The present probe's Venturi tube 20 (in general terms, a cylindrical pipe with a constriction in it) is placed at the end of the exhaust system. Venturi tube 20 allows the fluctuating exhaust pulses to be dampened and the negative pulse(s) amplified by the Venturi effect. Generally stated, the Venturi effect occurs in the case of a fluid (or air) flow through a tube that has a constriction located in it, wherein the flow velocity increases in the restriction thereby reducing its pressure and producing a partial vacuum due to the Bernoulli effect. The Venturi effect occurs in the present invention when the speed of the exhaust system pressure pulsations increases through Venturi tube 20. As an exhaust pulse enters Venturi tube 20, the exhaust must increase its speed as Venturi tube 20 narrows. This speed increase in the exhaust flow through Venturi tube 20 creates a low pressure area in Venturi tube 20 and sensing tube 22 is placed in that area. In the present invention, Venturi tube 20 may be embodied in a number of forms. For example, Venturi tube 20 may comprise a tube in which the inner diameter decreases due to an increased thickness of the wall of the tube at a particular location along the length of the tube, thus resulting in the decreased area through which air may flow necessary to generate the Venturi effect. Alternatively, Venturi tube 20 may comprise a tube with a constant inner diameter and in which an obstacle is placed at a location along the length of the tube, thereby resulting in a decreased area at the location of the obstacle through which air will flow, thereby causing a Venturi effect. With respect to FIG. 1 for example, the placement of sensing tube 22 within Venturi tube 20 results in a smaller area at the plane of the sensing tube through which air may flow at that point, thus causing a Venturi effect at the location of sensing tube 22.

Figure 3:
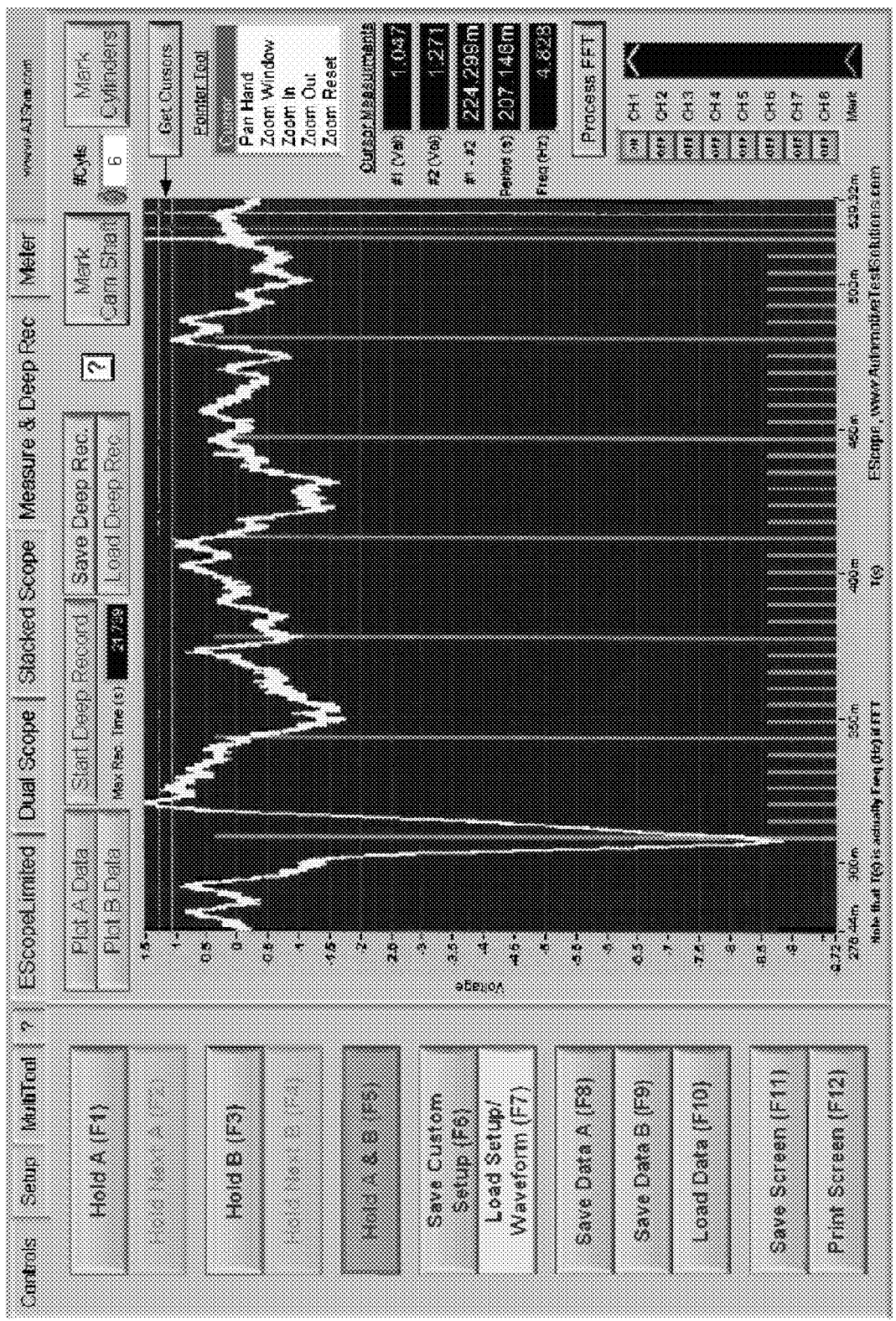
FIG. 3 is a screen-capture view of an oscilloscope displaying the waveform generated by a single-tube embodiment of the present invention under conditions of a single-cylinder misfire at idle.

In the present invention, Venturi tube 20 is placed in the exhaust stream, preferably at the end of the tailpipe 12, (however, Venturi tube 20 could be built into an exhaust system of a vehicle by a manufacturer as one possible alternative embodiment) to find a misfire in an internal combustion engine. Venturi tube 20 is coupled with electrical pressure transducer 36 to produce an analog voltage reading from the physical difference of pressure within Venturi tube 20. As the exhaust flows through Venturi tube 20, the pressure will change when there is an exhaust pulsation. Pressure transducer 36 senses the change in pressure in Venturi tube 20 where aperture 26 of sensing tube 22 is located and generates a voltage reading that directly corresponds to the pressure at aperture 26. Pressure transducer 36 is connected to an oscilloscope or an analog-to-digital converter and microprocessor, and a stable waveform, as depicted in FIG. 3, can be created from the pressure transducer's voltage signal. A technician can watch the waveform, or a microprocessor can analyze it, and the waveform aids in finding the misfire of a single cylinder or multiple cylinders.

More specifically, when incomplete combustion occurs within a cylinder, the gases do not expand, therefore, the pressure and temperature within the cylinder is lower. When the exhaust valve opens this lower pressure is pushed into the exhaust port lowering the exhaust pressure as well. Atmospheric pressure rushes into the exhaust system to fill this low pressure area within the exhaust. As air from the atmosphere enters the exhaust system it will travel through Venturi tube 20 that is located at the end of the tailpipe 12 of the vehicle. This air movement going into the exhaust system creates a pressure differential within Venturi tube 20. In this condition, Venturi tube 20 has a negative pressure created in it. Pressure transducer 36, in turn, has a large change in voltage amplitude. In the preferred embodiment, if the signal voltage changes abruptly with a negative voltage signal that increased more than 50% with a rapid change as measured in inches of $H_2O$, this indicates that a misfire has occurred (see FIG. 3). Of course, the electronic equipment utilized in this invention may be adjusted or modified to alter the specifics of a signal that indicate a misfire.

Venturi tube 20 also functions as a dampening device of the exhaust stream pulsations, which results in a change to the generated waveform. If the exhaust pulse is small, it will not have enough volume to decrease the pressure in Venturi tube 20 sufficiently to generate a signal to indicate a pressure decrease, thus the pulse is dampened out. The Venturi effect can be controlled such that Venturi tube 20 is tuned to dampen the exhaust pulsation to varying degrees. This is accomplished in one way by altering the inlet and outlet diameters of Venturi tube 20. A further degree of tuning can be accomplished by altering the bore diameter of Venturi tube 20. Making adjustments to the length of Venturi tube 20 can also help with dampening unwanted non-misfire pulses within the exhaust stream. Moreover, adjusting the size of sensing tube 22 and/or aperture 26 will also change the formation of the waveform from the pulses. Likewise, altering the size or length of connecting hose 34 to pressure transducer 36 will affect the formation of the waveform. Examples of the effects of various modifications are depicted in FIGS. 4A through 4BB, which are discussed further herein. Probe 10 dampens the undesired exhaust pulses and amplifies the desired exhaust pulses (i.e. those associated with a misfire), with the above techniques in mind.

By accelerating the flow of the exhaust stream, unwanted pulses are dampened and negative exhaust pulses are amplified, thereby resulting in a better exhaust probe for detecting misfires. The dampening of unwanted pulses and amplification of the negative pulses aids in the misfire detection process either when viewed with an oscilloscope or automated by a microprocessor. As a clean and concise signal is best for detecting misfires, the better the formation of the original signal, the more accurate the misfire detection equipment can be. By using a microprocessor, the waveform can be modified further by statistical filtering of the data. Statistical filters will increase the probability of finding and detecting a misfiring cylinder by removing or minimizing unwanted signal components and/or enlarging desired signal components from the pressure transducer.

It is desirable to locate a misfire and identify which cylinder the misfire came from. In order to identify the misfire and specific cylinder, a trigger is used. If a trigger is not used, the presence of a misfire will be identifiable or recognizable when viewing the waveform, but accurately identifying the specific cylinder(s) that is misfiring will not be possible. If the energy built in the ignition coil to ionize the spark plug electrodes is used as the trigger, the exhaust pulsation can be related to individual cylinders. To accomplish this, the firing order of the cylinders must be known. There is also a timing issue when applying this trigger to the exhaust pulse waveform. In a four-cycle engine, the ignition spark occurs at the end of the compression stroke. During the compression and power strokes both the intake and exhaust valves are closed. When the spark ionizes the spark plug electrodes the air/fuel mixture is ignited. In turn, the burning air/fuel mixture creates an expanding force that drives the piston away form the cylinder head. As the piston approaches the bottom of its stroke, the exhaust valve opens. The high pressure inside the cylinder moves to the low pressure area outside the cylinder which creates a pulse as it moves through the exhaust pipe. The piston now starts to move toward the cylinder head on the exhaust stroke, pushing out the remaining content of the cylinder into the exhaust system. If the ignition is used as the trigger for the exhaust pulse, there will be a delay between the spark ionizing the spark plug electrodes and the exhaust stroke. To compensate for this delay, the trigger must be moved from cylinder number one to the appropriate cylinder. For example, on a four-cylinder engine, the trigger is moved one cylinder after cylinder number one. On a six-cylinder engine, the trigger is moved two cylinders after cylinder number one. On an eight-cylinder engine, the trigger is moved three cylinders after cylinder number one. These adjustments will allow the crank shaft to rotate 360 degrees or one revolution in each engine. If, at engine idle, the timing of the ignition signal is adjusted in this way, the exhaust pulse will align with the number one cylinder at idle. This allows for the misfire indicator (the abrupt negative voltage signal) to be placed on the cylinder that created it. However, as the engine speed is increased, the exhaust pulse moves further away from the trigger. This movement depends on how much the engine speed is increased.

With reference to FIG. 3, a large, abrupt negative voltage signal is clearly present, which indicates a misfire. This misfire is aligned to the misfiring cylinder by using the trigger from the ignition spark. Once the ignition event has reoccurred this is an indication that the crank has rotated 720° or has completed an entire fire cycle of the engine. If the trigger-to-trigger time is divided by the number of cylinders, each division will indicate a cylinder. By applying the firing order each division can be assigned a cylinder. This assigned cylinder can now be associated with the waveform that is produced from the invention.

Figure 2:
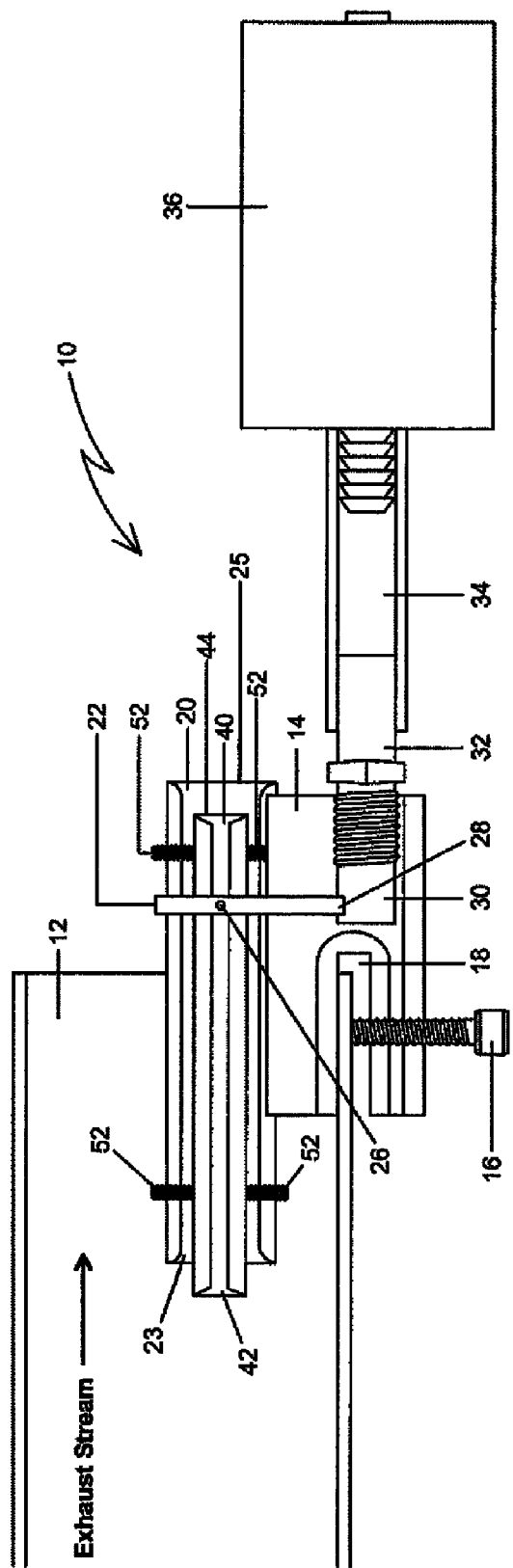
FIG. 2 is a side, partially cross-sectioned, view of a double-tube embodiment of the present invention wherein some hidden features are visible.

With reference to FIG. 2, the same principles discussed above are disclosed as a preferred double-tube embodiment of the present invention. The double-tube embodiment of FIG. 2 is similar to the single-tube embodiment of FIG. 1, however, an inner Venturi tube 40 is located within an outer Venturi tube 20. Inner tube 40 is preferably disposed within outer tube 20 such that first end 42 of inner tube 40 extends beyond first end 23 of outer tube 20, and second end 44 of inner tube 40 does not extend beyond second end 25 of outer tube 20. In fact, it is preferred that a gap exist between second ends 25 and 44. The presence of this gap in the double-tube embodiment of the present invention serves to further dampen the waveforms generated by the present invention by serving as a buffer against environmental factors that may influence the flow of air through inner tube 40. The extension of end 25 beyond end 44 essentially allows the inner tube end 44 to be exposed to a lower pressure than atmosphere. By controlling the tube size and length this pressure at the end of 44 can also be controlled. This will aid in dampening unwanted movement in the exhaust waveform. Inner tube 40 is held in place within outer tube 20 via set screws 52, which penetrate through outer tube 20 and press against the outside surface of inner tube 40. Set screws 52 are preferably located equidistantly around the circumference of outer tube 20, with three screws being located near first end 23 and three screws being located near second end 25. Inner tube 40 may be similarly positioned relative to outer tube 20 via a number of alternative methods, such as by formation of a cast part comprising both tubes. All other components of the double-tube embodiment are as described above with reference to the single-tube embodiment of FIG. 1. The preferred embodiment of the present invention also comprises a screen (not depicted) covering end 25 of tube 20 to aid in ensuring laminar flow of the air flowing through tube 20, however a screen is not required. Alternatively, a screen (not depicted) may be located within tube 20 near end 25.

FIGS. 4A through 4BB are screen-captures of an oscilloscope showing the waveform generated by single-tube embodiments of the present invention applied to a model year 2000 GMC 5.3 liter engine. The firing order of the cylinders in that engine is 1-8-7-2-6-5-4-3. The cylinders "killed" in the tests were cylinder 1 for a single-cylinder misfire and cylinders 1 and 3 for a double-cylinder misfire. With respect to those figures, the following variables in probe 10 and test conditions apply:

| FIG. | Venturi tube designation | Venturi tube length (in) | Venturi tube inner diameter (in) | Venturi tube outer diameter (in) | number of misfiring cylinders |
|---|---|---|---|---|---|
| 4A | A | 2 | 0.3 tapered to 0.4 | 0.63 | 1 |
| 4B | A | 2 | 0.3 tapered to 0.4 | 0.63 | 2 |
| 4C | B | 2 | 0.3 straight | 0.63 | 1 |
| 4D | B | 2 | 0.3 straight | 0.63 | 2 |
| 4E | C | 2 | 0.4 tapered to 0.3 tapered back to 0.4 | 0.63 | 1 |
| 4F | C | 2 | 0.4 tapered to 0.3 tapered back to 0.4 | 0.63 | 2 |
| 4G | D | 2 | 0.4 straight | 0.63 | 1 |
| 4H | D | 2 | 0.4 straight | 0.63 | 2 |
| 4I | E | 1 | 0.5 straight | 0.63 | 1 |
| 4J | E | 1 | 0.5 straight | 0.63 | 2 |
| 4K | F | 2 | 0.5 straight | 0.63 | 1 |
| 4L | F | 2 | 0.5 straight | 0.63 | 2 |
| 4M | G | 3 | 0.5 straight | 0.63 | 1 |
| 4N | G | 3 | 0.5 straight | 0.63 | 2 |
| 4O | H | 3 | 0.3 straight | 0.63 | 1 |
| 4P | H | 3 | 0.3 straight | 0.63 | 2 |
| 4Q | I | 3 | 0.4 straight | 0.63 | 1 |
| 4R | I | 3 | 0.4 straight | 0.63 | 2 |
| 4S | J | 3 | 0.5 straight | 0.75 | 1 |
| 4T | J | 3 | 0.5 straight | 0.75 | 2 |
| 4U | K | 3 | 0.5 straight | 0.75 to 1.2 bell shaped | 1 |
| 4V | K | 3 | 0.5 straight | 0.75 to 1.2 bell shaped | 2 |
| 4W | L | 2 | 0.2 straight | 0.75 | 1 |
| 4X | L | 2 | 0.2 straight | 0.75 | 2 |
| 4Y | M | 2 | 0.25 straight | 0.63 | 1 |
| 4Z | M | 2 | 0.25 straight | 0.63 | 2 |
| 4AA | N | 2 | 0.2 straight | 0.63 | 1 |
| 4BB | N | 2 | 0.2 straight | 0.63 | 2 |

** engine speed at idle for all

When FIGS. 4A through 4BB are compared with FIGS. 5A and 5B, the superiority of the present invention over the Senx™ prior art probe is evidence. FIGS. 5A and 5B are screen-captures of an oscilloscope showing the waveform generated by the Senx™ prior art probe applied to the same engine under the same conditions as that used in FIGS. 4A through 4BB. The engine speed is at idle, and FIG. 5A is a one-cylinder misfire, whereas FIG. 5B is a two-cylinder misfire. Comparison of the figures evidences the superior detection and identification of a misfire by the present invention as compared with the Senx™ prior art probe.

FIGS. 6A and 6B are screen-captures of an oscilloscope showing the waveform generated by the preferred double-tube embodiment of the present invention applied to the same engine under the same conditions as that used in FIGS. 4A through 4BB. The engine speed is at idle, and FIG. 6A is a one-cylinder misfire (cylinder number one) as is evident from the single, large abrupt negative voltage signal (the second one in this figure is simply the first cylinder misfiring a second time). FIG. 6B is a two-cylinder misfire (cylinders number one and eight) as is evident from the two consecutive large, abrupt negative voltage signals. Outer Venturi tube 20 of this embodiment has the following dimensions: 5.5 inch length, one inch outer diameter, and 0.86 inch inner diameter. Inner Venturi tube 40 of this embodiment has the following dimensions: 4.5 inch length, 0.62 inch outer diameter, 0.25 inch inner diameter.

Whereas the figures and description have illustrated and described the concept and preferred embodiment of the present invention, it should be apparent to those skilled in the art that various changes may be made in the form of the invention without affecting the scope thereof. The detailed description above is not intended in any way to limit the broad features or principles of the invention, or the scope of patent monopoly to be granted.

What is claimed is:

1. An engine misfire detection probe comprising:
   (a) a first Venturi tube having a first end and a second end, at least a portion of said first Venturi tube seated on a base along the length of said first Venturi tube, said base comprising a sensing chamber, said base adapted to be removably affixed to an exhaust pipe of an engine such that at least said first end of said first Venturi tube is placed in the exhaust stream of said exhaust pipe;
   (b) a sensing tube, at least a portion of said sensing tube located within said first Venturi tube, said sensing tube adapted to be coupled to an exhaust sensor.

2. The engine misfire detection probe of claim 1 wherein said sensing tube comprising a first end located outside of said first Venturi tube and a second end located within said sensing chamber, said first end closed and said second end open.

3. The engine misfire detection probe of claim 1 wherein said sensing tube further comprises an aperture positioned within said at least a portion of said sensing tube located within said first Venturi tube.

4. The engine misfire detection probe of claim 1 wherein said exhaust sensor is an electrical pressure transducer.

5. The engine misfire detection probe of claim 1 wherein said exhaust sensor is coupled to a processing system, said processing system capable of generating a waveform from said voltage signal.

6. An engine misfire detection probe comprising:
   (a) a first Venturi tube having a first end and a second end, at least a portion of said first Venturi tube seated on a base along the length of said first Venturi tube, said base comprising a sensing chamber, said base adapted to be removably affixed to an exhaust pipe of an engine such that at least said first end of said first Venturi tube is placed in the exhaust stream of said exhaust pipe;
   (b) a sensing tube, at least a portion of said sensing tube located within said first Venturi tube, said sensing tube adapted to be coupled to an exhaust sensor, wherein said exhaust sensor is coupled to a processing system, said processing system capable of generating a waveform from said voltage signal, and wherein said processing system is selected from the group consisting of an oscilloscope and a microprocessor.

7. An engine misfire detection probe comprising:
   (a) a first tube adapted to accelerate an exhaust stream from said engine as said exhaust stream flows through said first tube,
   (b) a pressure sensing system coupled to said first tube;
   (c) a first signal generating system coupled to said pressure sensing system;
   (d) a second signal generating system coupled to a trigger provided from a rotating engine; and
   (e) a signal processing system coupled to said first and second signal generating systems, said signal processing system synchronizing signals from said first and second signal generating systems.

8. The engine misfire detection probe of claim 7 wherein said first tube comprises a Venturi tube.

9. The engine misfire detection probe of claim 8 wherein said first Venturi tube is integrated as a component of an exhaust system of said engine.

10. The engine misfire detection probe of claim 8 wherein said first Venturi tube is a fixed component of an exhaust system of said engine.

11. The engine misfire detection probe of claim 7 wherein said second signal generating system produces a signal so that the position of the crankshaft of an engine relative to the position of a camshaft of an engine position is known.

12. The engine misfire detection probe of claim 7 wherein said trigger is an ignition discharge device of said engine.

* * * * *